United States Patent
Zhu et al.

(10) Patent No.: US 8,437,270 B2
(45) Date of Patent: May 7, 2013

(54) METHOD AND APPARATUS FOR TRANSMITTING REFERENCE SIGNAL

(75) Inventors: Peng Zhu, Shenzhen (CN); Peng Hao, Shenzhen (CN); Bin Yu, Shenzhen (CN); Yuqiang Zhang, Shenzhen (CN); Yuxin Wang, Shenzhen (CN); Rong Zhang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 13/258,565

(22) PCT Filed: Jun. 29, 2010

(86) PCT No.: PCT/CN2010/074721
§ 371 (c)(1),
(2), (4) Date: Feb. 13, 2012

(87) PCT Pub. No.: WO2011/023035
PCT Pub. Date: Mar. 3, 2011

(65) Prior Publication Data
US 2012/0140717 A1    Jun. 7, 2012

(30) Foreign Application Priority Data

Aug. 31, 2009    (CN) ............ 2009 1 0171827

(51) Int. Cl.
*H04L 12/56* (2006.01)
*H04J 1/16* (2006.01)
(52) U.S. Cl.
USPC ............ 370/252; 370/329; 370/430; 370/503
(58) Field of Classification Search ............ 370/252, 370/329, 430, 503
See application file for complete search history.

(56) References Cited

U.S. PATENT DOCUMENTS

2012/0120908 A1* 5/2012 Ahn et al. ............ 370/329

FOREIGN PATENT DOCUMENTS

| CN | 101459462 A | 6/2009 |
| CN | 101515809 A | 8/2009 |
| CN | 101645868 A | 2/2010 |
| CN | 101741793 A | 6/2010 |

OTHER PUBLICATIONS

LG Electronics, "Some aspects of PUCCH/PUSCH transmission over multiple component carriers," R1-090208, 3GPP TSG RAN WG1 #55bis, Ljubljana, Slovenia, Jan. 12-16, 2009.

* cited by examiner

*Primary Examiner* — John Pezzlo
(74) *Attorney, Agent, or Firm* — Dascenzo Intellectual Property Law, P.C.

(57) ABSTRACT

The present invention provides a method for transmitting reference signals comprising: during carrier aggregation, a user equipment sending physical uplink shared channel (PUSCH) on one or more component carriers, and sending demodulation reference signals (DM RS) for the PUSCH on each section of bandwidth occupied by the PUSCH on each component carrier, wherein a DM RS sequence on a section of bandwidth is an independent sequence or part of an independent sequence and forms an independent sequence with DM RS sequences on multiple sections of bandwidth other than the section of bandwidth; the section of bandwidth is a section of continuous bandwidth occupied by the PUSCH on any component carrier, or is any of the multiple sections of bandwidth occupied by the PUSCH on any component carrier. The Present invention further provides a corresponding apparatus.

20 Claims, 7 Drawing Sheets

(a) Normal cyclic prefix (b) Extended cyclic prefix

METHOD AND APPARATUS FOR TRANSMITTING REFERENCE SIGNAL

TECHNICAL FIELD

The present invention relates to the field of mobile communication, and more particularly, to a method and an apparatus for transmitting reference signals.

BACKGROUND OF THE RELATED ART

In the third Generation Partnership Project Long Term Evolution (3GPP LTE) system, uplink resource allocation takes a physical resource block (PRB for short) as a unit. One PRB occupies $N_{SC}^{RB}$ continuous subcarriers in frequency domain, and occupies $N_{symb}^{UL}$ continuous subcarriers in time domain. $N_{SC}^{RB}=12$, and a subcarrier interval is 15 kHz, that is, the width of a PRB in frequency domain is 180 kHz. For a normal cyclic prefix (Normal CP for short), $N_{symb}^{UL}=7$, and for an extended cyclic prefix (Extended CP for short), $N_{symb}^{UL}=6$, that is, the length of a PRB in time domain is a slot (0.5 ms). Thus, a PRB comprises $N_{symb}^{UL} \times N_{SC}^{RB}$ resource elements (RE for short). In one slot, an index of a PRB is $n_{PRB}$, where $n_{PRB}=0,\ldots,N_{RB}^{UL}-1$, and $N_{RB}^{UL}$ is the number of PRBs corresponding to the uplink system bandwidth; an index pair of a RE is (k,l), where $k=0,\ldots,N_{RB}^{UL}N_{SC}^{RB}-1$ is an index in frequency domain, and $l=0,\ldots,N_{symb}^{UL}-1$ is an index in time domain, then $$n_{PRB} = \left\lfloor \frac{k}{N_{SC}^{RB}} \right\rfloor$$

Taking the normal CP as an example, the structure of the PRB is shown in FIG. 1.

As shown in FIG. 2, in the LTE system, Physical Uplink Shared Channels (PUSCH) of a plurality of User Equipments (UE) in a cell frequency-division multiplex the uplink system bandwidth, that is, the PUSCHs of different UEs are orthogonal in frequency domain and occupy different physical resource blocks. However, resource allocation uses a localized allocation method, that is, the PUSCH of one UE occupies a section of continuous bandwidth in frequency domain, which is a part of the entire uplink system bandwidth. The section of bandwidth contains a set of continuous PRBs, the number of which is $M_{RB}^{PUSCH}$, and the number of its contained continuous subcarriers is $$M_{sc}^{PUSCH} = M_{RB}^{PUSCH} \cdot N_{sc}^{RB}$$

Uplink reference signals in the LTE system are divided into demodulation reference signals (DM RS) and Sounding Reference Signals (SRS). The DM RSs are further divided into DM RSs for the PUSCH and DM RSs for the Physical Uplink Control Channel (PUCCH). All the uplink reference signals are reference signal sequences in the same form.

An uplink reference signal sequence $r_{u,v}^{(\alpha)}(n)$ in the LTE system is defined as cyclic shift of a base sequence $\bar{r}_{u,v}(n)$ $$r_{u,v}^{(\alpha)}(n)=e^{j\alpha n}\bar{r}_{u,v}(n), 0 \leq n \leq M_{sc}^{RS}-1$$

where $MR_{sc}^{RS}=mN_{sc}^{RB}$ is the length of the reference signal sequence, $1 \leq m \leq N_{RB}^{max,UL}$. A different cyclic shift quantity α is used for the base sequence $\bar{r}_{u,v}(n)$, and a plurality of reference signal sequences can be defined.

The definition of the base sequence $\bar{r}_{u,v}(n)$ depends on the sequence length $M_{sc}^{RS}$.

If $M_{sc}^{RS} \geq 3N_{sc}^{RB}$, $$\bar{r}_{u,v}(n)=x_q(n \bmod N_{ZC}^{RS}), 0 \leq n \leq M_{sc}^{RS}-1$$

where the $q^{th}$ Zadoff-Chu sequence (ZC sequence for short) is defined as $$x_q(m) = e^{-j\frac{\pi q m(m+1)}{N_{ZC}^{RS}}}, 0 \leq m \leq N_{ZC}^{RS}-1$$

and q is given by the following equation, $$q=\lfloor \bar{q}+1/2 \rfloor + v \cdot (-1)^{\lfloor 2\bar{q} \rfloor}$$

$$\bar{q}=N_{ZC}^{RS} \cdot (u+1)/31$$

the length $N_{ZC}^{RS}$ of the ZC sequence is the largest prime number satisfying $N_{ZC}^{RS} < M_{sc}^{RS}$, that is, the ZC sequence with the length of $N_{ZC}^{RS}$ forms the base sequence with the length of $M_{sc}^{RS}$ by cyclic shift.

If $M_{sc}^{RS}=N_{sc}^{RB}$ or $M_{sc}^{RS}=2N_{sc}^{RB}$, $$\bar{r}_{u,v}(n)=e^{j\phi(n)\pi/4}, 0 \leq n \leq M_{sc}^{RS}-1$$

where values of φ(n) are given in Table 1 and Table 2 respectively.

TABLE 1

| u | φ(0), . . . , φ(11) | | | | | | | | | | | |
|---|---|---|---|---|---|---|---|---|---|---|---|---|
| 0 | −1 | 1 | 3 | −3 | 3 | 3 | 1 | 1 | 3 | 1 | −3 | 3 |
| 1 | 1 | 1 | 3 | 3 | 3 | −1 | 1 | −3 | −3 | 1 | −3 | 3 |
| 2 | 1 | 1 | −3 | −3 | −3 | −1 | −3 | −3 | 1 | −3 | 1 | −1 |
| 3 | −1 | 1 | 1 | 1 | 1 | −1 | −3 | −3 | 1 | −3 | 3 | −1 |
| 4 | −1 | 3 | 1 | −1 | 1 | −1 | −3 | −1 | 1 | −1 | 1 | 3 |
| 5 | 1 | −3 | 3 | −1 | −1 | 1 | 1 | −1 | −1 | 3 | −3 | 1 |
| 6 | −1 | 3 | −3 | −3 | −3 | 3 | 1 | −1 | 3 | 3 | −3 | 1 |
| 7 | −3 | −1 | −1 | −1 | 1 | −3 | 3 | −1 | 1 | −3 | 3 | 1 |
| 8 | 1 | −3 | 3 | 1 | −1 | −1 | −1 | 1 | 1 | 3 | −1 | 1 |
| 9 | 1 | −3 | −1 | 3 | 3 | −1 | −3 | 1 | 1 | 1 | 1 | 1 |
| 10 | −1 | 3 | −1 | 1 | 1 | −3 | −3 | −1 | −3 | −3 | 3 | −1 |
| 11 | 3 | 1 | −1 | −1 | 3 | 3 | −3 | 1 | 3 | 1 | 3 | 3 |
| 12 | 1 | −3 | 1 | 1 | −3 | 1 | 1 | 1 | −3 | −3 | −3 | 1 |
| 13 | 3 | 3 | −3 | 3 | −3 | 1 | 1 | 3 | −1 | −3 | 3 | 3 |
| 14 | −3 | 1 | −1 | −3 | −1 | 3 | 1 | 3 | 3 | 3 | −1 | 1 |
| 15 | 3 | −1 | 1 | −3 | −1 | −1 | 1 | 1 | 3 | 1 | −1 | −3 |
| 16 | 1 | 3 | 1 | −1 | 1 | 3 | 3 | 3 | −1 | −1 | 3 | −1 |
| 17 | −3 | 1 | 1 | 3 | −3 | 3 | −3 | −3 | 3 | 1 | 3 | −1 |
| 18 | −3 | 3 | 1 | 1 | −3 | 1 | −3 | −3 | −1 | −1 | 1 | −3 |
| 19 | −1 | 3 | 1 | 3 | 1 | −1 | −1 | 3 | −3 | −1 | −3 | −1 |
| 20 | −1 | −3 | 1 | 1 | 1 | 1 | 3 | 1 | −1 | 1 | −3 | −1 |
| 21 | −1 | 3 | −1 | 1 | −3 | −3 | −3 | −3 | −3 | 1 | −1 | −3 |
| 22 | 1 | 1 | −3 | −3 | −3 | −3 | −1 | 3 | −3 | 1 | −3 | 3 |
| 23 | 1 | 1 | −1 | −3 | −1 | −3 | 1 | −1 | 1 | 3 | −1 | 1 |
| 24 | 1 | 1 | 3 | 1 | 3 | 3 | −1 | 1 | −1 | −3 | −3 | 1 |
| 25 | 1 | −3 | 3 | 3 | 1 | 3 | 3 | 1 | −3 | −1 | −1 | 3 |
| 26 | 1 | 3 | −3 | −3 | 3 | −3 | 1 | −1 | −1 | 3 | −1 | −3 |
| 27 | −3 | −1 | −3 | −1 | −3 | 3 | 1 | −1 | 1 | 3 | −3 | −3 |
| 28 | −1 | 3 | −3 | 3 | −1 | 3 | 3 | −3 | 3 | 3 | −1 | −1 |
| 29 | 3 | −3 | −3 | −1 | −1 | −3 | −1 | 3 | −3 | 3 | 1 | −1 |

TABLE 2

| u | φ(0), . . . , φ(23) | | | | | | | | | | | | | | | | | | | | | | | |
|---|---|---|---|---|---|---|---|---|---|---|---|---|---|---|---|---|---|---|---|---|---|---|---|---|
| 0 | −1 | 3 | 1 | −3 | 3 | −1 | 1 | 3 | −3 | 3 | 1 | 3 | −3 | 3 | 1 | 1 | −1 | 1 | 3 | −3 | 3 | −3 | −1 | −3 |
| 1 | −3 | 3 | −3 | −3 | −3 | 1 | −3 | −3 | 3 | −1 | 1 | 1 | 1 | 3 | 1 | −1 | 3 | −3 | −3 | 1 | 3 | 1 | 1 | −3 |
| 2 | 3 | −1 | 3 | 3 | 1 | 1 | −3 | 3 | 3 | 3 | 3 | 1 | −1 | 3 | −1 | 1 | 1 | −1 | −3 | −1 | −1 | 1 | 3 | 3 |
| 3 | −1 | −3 | 1 | 1 | 3 | −3 | 1 | 1 | −3 | −1 | −1 | 1 | 3 | 1 | 3 | 1 | −1 | 3 | 1 | 1 | −3 | −1 | −3 | −1 |
| 4 | −1 | −1 | −1 | −3 | −3 | −1 | 1 | 1 | 3 | 3 | −1 | 3 | −1 | 1 | −1 | −3 | 1 | −1 | −3 | −3 | 1 | −3 | −1 | −1 |
| 5 | −3 | 1 | 1 | 3 | −1 | 1 | 3 | 1 | −3 | 1 | −3 | 1 | 1 | −1 | −1 | 3 | −1 | −3 | 3 | −3 | −3 | −3 | 1 | 1 |

TABLE 2-continued

| u | $\phi(0), \ldots, \phi(23)$ | | | | | | | | | | | | | | | | | | | | | | | |
|---|---|---|---|---|---|---|---|---|---|---|---|---|---|---|---|---|---|---|---|---|---|---|---|---|
| 6 | 1 | 1 | -1 | -1 | 3 | -3 | -3 | 3 | -3 | 1 | -1 | -1 | 1 | -1 | 1 | 1 | -1 | -3 | -1 | 1 | -1 | 3 | -1 | -3 |
| 7 | -3 | 3 | 3 | -1 | -1 | -3 | -1 | 3 | 1 | 3 | 1 | 3 | 1 | -1 | 3 | 1 | -1 | 3 | -3 | -1 | -1 | 1 |
| 8 | -3 | 1 | 3 | -3 | 1 | -1 | -3 | 3 | -3 | 3 | -1 | -1 | -1 | 1 | -3 | -3 | 1 | -3 | -3 | -3 | 1 | -3 |
| 9 | 1 | 1 | -3 | 3 | 3 | -1 | -3 | -1 | 3 | -3 | 3 | 3 | 3 | -1 | 1 | 1 | -3 | 1 | -1 | 1 | 1 | -3 | 1 | 1 |
| 10 | -1 | 1 | -3 | -3 | 3 | -1 | 3 | -1 | -1 | -3 | -3 | -3 | -1 | -3 | -3 | 1 | -1 | 1 | 3 | 3 | -1 | 1 | -1 | 3 |
| 11 | 1 | 3 | 3 | -3 | -3 | 1 | 3 | 1 | -1 | -3 | -3 | -3 | 3 | 3 | -3 | 3 | 3 | -1 | -3 | 3 | -1 | 1 | -3 | 1 |
| 12 | 1 | 3 | 3 | 1 | 1 | 1 | -1 | -1 | 1 | -3 | 3 | -1 | 1 | 1 | -3 | 3 | 3 | -1 | -3 | 3 | -3 | -1 | -3 | -1 |
| 13 | 3 | -1 | -1 | -1 | -1 | -3 | -1 | 3 | 3 | 1 | -1 | 1 | 3 | 3 | -1 | 1 | 1 | -3 | 1 | 3 | -1 | -3 | 3 |
| 14 | -3 | -3 | 3 | 1 | 3 | 1 | -3 | 3 | 1 | 3 | 1 | 1 | 3 | 3 | -1 | -1 | -3 | 1 | -3 | -1 | 3 | 1 | 1 | 3 |
| 15 | -1 | -1 | 1 | -3 | 1 | 3 | -3 | 1 | -1 | -3 | -1 | 3 | 1 | 3 | 1 | -1 | -3 | -3 | -1 | -1 | -3 | -3 | -3 | -1 |
| 16 | -1 | -3 | 3 | -1 | -1 | -1 | -1 | 1 | 1 | -3 | 3 | 1 | 3 | 3 | 1 | -1 | 1 | -3 | 1 | -3 | 1 | 1 | -3 | -1 |
| 17 | 1 | 3 | -1 | 3 | 3 | -1 | -3 | 1 | -1 | -3 | 3 | 3 | 3 | -1 | 1 | 1 | 3 | -1 | -3 | -1 | 3 | -1 | -1 | -1 |
| 18 | 1 | 1 | 1 | 1 | 1 | -1 | 3 | -1 | -3 | 1 | 1 | 3 | -3 | 1 | -3 | -1 | 1 | 1 | -3 | -3 | 3 | 1 | 1 | -3 |
| 19 | 1 | 3 | 3 | 1 | -1 | -3 | 3 | -1 | 3 | 3 | 3 | -3 | 1 | -1 | 1 | -1 | -3 | -1 | 1 | 3 | -1 | 3 | -3 | -3 |
| 20 | -1 | -3 | 3 | -3 | -3 | -3 | -1 | -1 | -3 | -1 | -3 | 3 | 1 | 3 | -3 | -1 | 3 | -1 | 1 | -1 | 3 | -3 | 1 | -1 |
| 21 | -3 | -3 | 1 | 1 | -1 | 1 | -1 | 1 | -1 | 3 | 1 | -3 | -1 | 1 | -1 | 1 | -1 | -1 | 3 | 3 | -3 | -1 | 1 | -3 |
| 22 | -3 | -1 | -3 | 3 | 1 | -1 | -3 | -1 | -3 | -3 | 3 | -3 | 3 | -3 | -1 | 1 | 3 | 1 | -3 | 1 | 3 | 3 | -1 | -3 |
| 23 | -1 | -1 | -1 | -1 | 3 | 3 | 3 | 1 | 3 | 3 | -3 | 1 | 3 | -1 | 3 | -1 | 3 | 3 | -3 | 3 | 1 | -1 | 3 | 3 |
| 24 | 1 | -1 | 3 | 3 | -1 | -3 | 3 | -3 | -1 | -1 | 3 | -1 | 3 | -1 | -1 | 1 | 1 | 1 | -1 | -1 | -3 | -1 | 3 |
| 25 | 1 | -1 | 1 | -1 | 3 | -1 | 3 | 1 | 1 | -1 | -1 | -3 | 1 | 1 | -3 | 1 | 3 | -3 | 1 | 1 | -3 | -3 | -1 | -1 |
| 26 | -3 | -1 | 1 | 3 | 1 | 1 | -3 | -1 | -1 | -3 | 3 | -3 | 3 | 1 | -3 | 3 | -3 | 1 | -1 | 1 | -3 | 1 | 1 | 1 |
| 27 | -1 | -3 | 3 | 3 | 1 | 1 | 3 | -1 | -3 | -1 | -1 | -1 | 3 | 1 | -3 | -3 | -1 | 3 | -3 | -1 | -3 | -1 | -3 | -1 |
| 28 | -1 | -3 | -1 | -1 | 1 | -3 | -1 | -1 | 1 | -1 | -3 | 1 | 1 | -3 | 1 | -3 | -3 | 3 | 1 | 1 | -1 | 3 | -1 | -1 |
| 29 | 1 | 1 | -1 | -1 | -3 | -1 | 3 | -1 | 3 | -1 | 1 | 3 | 1 | -1 | 3 | 1 | 3 | -3 | -3 | 1 | -1 | -1 | 1 | 3 |

The base sequence $\bar{r}_{u,v}(n)$ is divided into 30 groups, $u \in \{0, 1, \ldots, 29\}$ is a group serial number, and v is an intragroup sequence serial number. Each group contains base sequences with all lengths from $M_{sc}^{RS}=N_{sc}^{RB}$ to $M_{sc}^{RS}=N_{RB}^{max,UL} \cdot N_{sc}^{RB}$, where there is only one base sequence (v=0) with sequence length satisfying $N_{sc}^{RB} \leq M_{sc}^{RS} \leq 5N_{sc}^{RB}$ for each length, and there are two base sequences (v=0, 1) with sequence length satisfying $6N_{sc}^{RB} \leq M_{sc}^{RS} \leq N_{RB}^{max,UL} \cdot N_{sc}^{RB}$ for each length. The group serial number u and the intragroup sequence serial number v may vary with the time to achieve group hopping and sequence hopping.

The group serial number u of the base sequence used in a slot $n_s$ is defined by a group hopping pattern $f_{gh}(n_s)$ and a sequence-shift pattern $f_{ss}$ according to the following equation $$u=(f_{gh}(n_s)+f_{ss}) \bmod 30$$

There are 17 group hopping patterns and 30 sequence-shift patterns.

The group hopping function can notify the high layer signaling to turn on or off. The group hopping pattern $f_{gh}(n_s)$ is:

$$f_{gh}(n_s) = \begin{cases} 0 & \text{group hopping function being off} \\ \left(\sum_{i=0}^{7} c(8n_s+i) \cdot 2^i\right) \bmod 30 & \text{group hopping function being on} \end{cases}$$

In a radio frame, $n_s=0, 1, \ldots, 19$; c(i) is a pseudo-random sequence which is initialized at the beginning of each frame, the initial value is $$c_{init} = \left\lfloor \frac{N_{ID}^{cell}}{30} \right\rfloor,$$

and $N_{ID}^{cell}$ is a physical layer cell ID.

The PUCCH and the PUSCH have the same group hopping pattern but different sequence-shift patterns.

The sequence-shift pattern $f_{ss}^{PUCCH}$ of the PUCCH is:

$$f_{ss}^{PUCCH}=N_{ID}^{cell} \bmod 30$$

The sequence-shift pattern $f_{ss}^{PUCCH}$ of the PUSCH is:

$$f_{ss}^{PUSCH}=(f_{ss}^{PUCCH}+\Delta_{ss}) \bmod 30$$

where $\Delta_{ss} \in \{0, 1, \ldots, 29\}$ is configured by the high layer.

Sequence hopping is only used when the length of the reference signal sequence is $M_{sc}^{RS} \geq 6N_{sc}^{RB}$.

When the length of the reference signal sequence is $M_{sc}^{RS} < 6N_{sc}^{RB}$, there is only one base sequence with length of $M_{sc}^{RS}$ in each group, and the intragroup sequence serial number of the base sequence is v=0.

When the length of the reference signal sequence is $M_{sc}^{RS} \geq 6N_{sc}^{RB}$, there are two base sequences with length of v=0, 1, and the intragroup sequence serial number of the base sequence used in the slot $n_s$ is, $$v = \begin{cases} c(n_s) & \text{sequence hopping function is on} \\ 0 & \text{otherwise} \end{cases} \text{ if group hopping function is off,}$$

where in a radio frame, $n_s=0, 1, \ldots, 19$, and c(i) is a pseudo-random sequence which is initialized at the beginning of each frame, and the initial value is $$c_{init} = \left\lfloor \frac{N_{ID}^{cell}}{30} \right\rfloor \cdot 2^5 + f_{ss}^{PUSCH}.$$

A DM RS sequence $r^{PUSCH}(\cdot)$ for the PUSCH is defined as $$r^{PUSCH}(m \cdot M_{sc}^{RS}+n)=r_{u,v}^{(\alpha)}(n)$$

where m=0,1

$n=0, \ldots, M_{sc}^{RS}-1$ and $M_{sc}^{RS}=M_{sc}^{PUSCH}$ m=0, 1 correspond to two slots in one subframe (with the length of 1 ms) respectively.

In the slot $n_s$, the cyclic shift quantity $\alpha$ is:

$$\alpha = 2\pi n_{cs}/12$$

where $$n_{cs} = (n_{DMRS}^{(1)} + n_{DMRS}^{(2)} + n_{PRS}(n_s)) \bmod 12$$

$n_{DMRS}^{(1)}$ is configured with high layer parameters, and $n_{DMRS}^{(2)}$ is configured with system signaling, $$n_{PRS}(n_s) = \sum_{i=0}^{7} c(8N_{symb}^{UL} \cdot n_s + i) \cdot 2^i$$

where in a radio frame, $n_s = 0, 1, \ldots, 19$; $c(i)$ is a pseudo-random sequence which is initialized at the beginning of each frame, and its initial value is $$c_{init} = \left\lfloor \frac{N_{ID}^{cell}}{30} \right\rfloor \cdot 2^5 + f_{ss}^{PUSCH}.$$

The structure of the DM RS of the PUSCH is shown in FIG. 3 and FIG. 4. After the sequence $r^{PUSCH}(\cdot)$ is multiplied by a magnitude scaling factor $\beta^{PUSCH}$, starting with $r^{PUSCH}(0)$, the sequence $r^{PUSCH}(\cdot)$ is mapped to the same physical resource block set for corresponding PUSCH transmission. When the sequence $r^{PUSCH}(\cdot)$ is mapped to RE (k,l) of a subframe, the mapping is performed first in frequency domain (k) and then in time-domain (l) in an ascending order of k and l. The DM RS in each slot is always located at the fourth one (l=3) of seven normal CP symbols or the third one (l=2) of six extended CP symbols in this slot.

Since the DM RSs of the PUSCH of each UE are sent within the transmission bandwidth of the PUSCH of the UE and the PUSCHs of all UEs in the cell are orthogonal with each other in frequency domain, the corresponding DM RSs are orthogonal with each other in frequency domain as well.

The LTE-Advanced system (LTE-A system for short) is a next-generation evolution system of the LTE system. As shown in FIG. 5, the LTE-A system extends the transmission bandwidth using the carrier aggregation technology, and each aggregated carrier is called as a component carrier. A plurality of component carriers might be continuous or non-continuous, and they might be in the same frequency band or different frequency bands.

During carrier aggregation, when a UE sends the PUSCH on a plurality of component carriers, how to send the demodulation reference signals (DM RS) has become a problem to be solved urgently.

In addition, in the LTE-A systems, the PUSCH of a UE within a component carrier might use continuous or non-continuous resource allocation method according to instruction of the system signaling. By continuous resource allocation, it is meant that localized resource allocation method, i.e., a PUSCH transmit signal of the UE occupies a section of continuous bandwidth within a component carrier; by non-continuous resource allocation, it is meant that the PUSCH transmit signal of the UE occupies multiple sections of bandwidths within a component carrier, and these sections of bandwidth are non-continuous, and each section of bandwidth contains a set of continuous PRBs.

For the PUSCH in the non-continuous resource allocation, how to send the demodulation reference signals (DM RS) has become a problem required to be solved.

Content of the Invention

A technical problem to be solved by the present invention is to provide a method and an apparatus for transmitting reference signals so as to solve the problem of transmitting demodulation reference signals (DM RS) when a user equipment transmits the PUSCH on a plurality of component carriers as well as on multiple sections of bandwidth in one component carrier.

In order to solve the aforementioned technical problem, the present invention provides a method for transmitting reference signals comprising: during carrier aggregation, a user equipment sending physical uplink shared channel (PUSCH) on one or more component carriers, and sending demodulation reference signals (DM RS) for the PUSCH on each section of bandwidth occupied by the PUSCH on each component carrier, wherein a DM RS sequence on a section of bandwidth is an independent sequence or part of an independent sequence and forms an independent sequence with DM RS sequences on multiple sections of bandwidth other than the section of bandwidth; the section of bandwidth is a section of continuous bandwidth occupied by the PUSCH on any component carrier, or is any of the multiple sections of bandwidth occupied by the PUSCH on any component carrier.

The method might also have the following feature: the DM RS sequences on the multiple sections of bandwidth occupied by the PUSCH on the same component carrier form an independent sequence, and the DM RS sequence on each section of bandwidth is part of the independent sequence.

The method might also have the following feature: the DM RS sequence on each section of bandwidth occupied by the PUSCH on each component carrier is an independent sequence.

The method might also have the following feature: a base sequence of the DM RS sequence on each section of bandwidth comes from the same or a different group, when a group hopping function is on, a group serial number u of the DM RS sequence on each section of bandwidth varies with a slot in one radio frame, and a group hopping pattern of the DM RS sequence on each section of bandwidth is the same or different.

The method might also have the following feature: in the same slot, if base sequences of a plurality of independent sequences come from the same group and have the same cyclic shift quantity, and lengths of the sequences are the same and greater than or equal to $6N_{sc}^{RB}$, where $N_{sc}^{RB}$ is the number of subcarriers occupied by one physical resource block in frequency domain, then the intragroup sequence serial numbers of the base sequences of the plurality of independent sequences are the same or different, when the group hopping function is off while the sequence hopping function is on, sequence hopping patterns of the plurality of independent sequences are the same or different, and the independent sequence is a DM RS sequence on a section of bandwidth or a sequence formed collectively from DM RS sequences on multiple sections of bandwidth.

The method might also have the following feature: if base sequences of two independent sequences come from the same group and have the same cyclic shift quantity, and lengths of the two independent sequences are the same and greater than or equal to $6N_{sc}^{RB}$, where $N_{sc}^{RB}$ is the number of subcarriers occupied by one physical resource block in frequency domain, then the intragroup sequence serial numbers $v_i, v_j \in \{0,1\}$ of the two independent sequences satisfy $v_i = (v_j + 1) \bmod 2$; if the group hopping function is off while the sequence hopping function is on, sequence hopping patterns of the two independent sequences satisfy $v_i(n_s) = (v_j(n_s) + 1) \bmod 2$, and each of the independent sequences is a DM RS sequence on a section of bandwidth or a sequence formed collectively from DM RS sequences on multiple sections of bandwidth.

The method might also have the following feature: when the DM RS sequence on the section of bandwidth is an independent sequence, the DM RS sequence $r^{PUSCH}(\cdot)$ on the section of bandwidth is:

$$r^{PUSCH}(m \cdot M_{sc}^{RS}+n)=r_{u,v}^{(\alpha)}(n)$$

where $m=0,1$ $n=0,\ldots,M_{sc}^{RS}-1$ and the sequence length $M_{sc}^{RS}$ is the number of subcarriers $M_{sc}^{PUSCH}$ corresponding to the section of bandwidth, m=0, 1 correspond to two slots in one subframe respectively, α is the cyclic shift quantity, u is the group serial number, and v is the intragroup sequence serial number.

The method might also have the following feature: when DM RS sequences on R sections of bandwidth are part of the independent sequence $r^{PUSCH}(\cdot)$, $r^{PUSCH}(\cdot)$ is $$r^{PUSCH}(m \cdot M_{sc}^{RS}+n)=r_{u,v}^{(\alpha)}(n)$$

where $m=0,1$ $n=0,\ldots,M_{sc}^{RS}-1$ and $M_{sc}^{RS}=M_{sc}^{PUSCH}$ where $r_{u,v}(n)$ is the base sequence, α is the cyclic shift quantity, u is the group serial number, v is the intragroup sequence serial number; m=0, 1 correspond to two slots in a subframe respectively, and $M_{sc}^{PUSCH}$ is the total number of subcarriers corresponding to the R sections of bandwidth.

The DM RS sequence $r^{PUSCH,r}(\cdot)$ on the $r^{th}$ section of bandwidth of the R sections of bandwidths is:

$$r^{PUSCH,r}(m \cdot M_{sc}^{PUSCH,r}+n) = r^{PUSCH}\left(m \cdot M_{sc}^{RS} + \sum_{i=0}^{r-1} M_{sc}^{PUSCH,i} + n\right)$$

where $r=1,\ldots,R-1$ $m=0,1$ $n=0,\ldots,M_{sc}^{PUSCH,r}-1$ the DM RS sequence $r^{PUSCH,0}(\cdot)$ on the $0^{th}$ section of bandwidth is:

$$r^{PUSCH,0}(m \cdot M_{sc}^{PUSCH,0}+n)=r^{PUSCH}(m \cdot M_{sc}^{RS}+n)$$

where $m=0,1$ $n=0,\ldots,M_{sc}^{PUSCH,0}-1$ $M_{sc}^{PUSCH,r}$ is the number of subcarriers corresponding to the $r^{th}$ section of bandwidth.

The method might also have the following feature: after the sequence $r^{PUSCH}(\cdot)$ is multiplied by a magnitude scaling factor $\beta_{PUSCH}$, starting with $r^{PUSCH}(0)$, the sequence $r^{PUSCH}(\cdot)$ is mapped to the same physical resource block set for corresponding PUSCH transmission, when the sequence $r^{PUSCH}(\cdot)$ is mapped to RE(k,l) of a subframe, the mapping is performed first in frequency domain (k) and then in time-domain (l) in an ascending order of k and l, the DM RS for the PUSCH in each slot is located at the fourth one (l=3) of seven normal cyclic prefix symbols or the third one (l=2) of six extended cyclic prefix symbols.

The present invention also provides an apparatus for transmitting reference signals configured to: during carrier aggregation, send demodulation reference signals (DM RS) for PUSCH on each section of bandwidth occupied by the PUSCH on each component carrier, wherein a DM RS sequence on a section of bandwidth is an independent sequence or part of an independent sequence and forms an independent sequence with DM RS sequences on multiple sections of bandwidth other than the section of bandwidth; the section of bandwidth is a section of continuous bandwidth occupied by the PUSCH on any component carrier, or is any of the multiple sections of bandwidth occupied by the PUSCH on any component carrier.

The apparatus might also have the following feature: the DM RS sequence sent by the apparatus satisfies the following conditions: the DM RS sequences on the multiple sections of bandwidth occupied by the PUSCH on the same component carrier form an independent sequence, and the DM RS sequence on each section of bandwidth is part of the independent sequence.

The apparatus might also have the following feature: the DM RS sequence sent by the apparatus on each section of bandwidth occupied by the PUSCH on each component carrier is an independent sequence.

The apparatus might also have the following feature: the DM RS sequence sent by the apparatus satisfies the following conditions: a base sequence of the DM RS sequence on each section of bandwidth comes from the same or a different group, when a group hopping function is on, a group serial number u of the DM RS sequence on each section of bandwidth varies with a slot in one radio frame, and a group hopping pattern of the DM RS sequence on each section of bandwidth is the same or different.

The apparatus might also have the following feature: the DM RS sequence sent by the apparatus satisfies the following conditions: in the same slot, if base sequences of a plurality of independent sequences come from the same group and have the same cyclic shift quantity, and lengths of the sequences are the same and greater than or equal to $6N_{sc}^{RB}$, where $N_{sc}^{RB}$ is the number of subcarriers occupied by one physical resource block in frequency domain, then the intragroup sequence serial numbers of the base sequences of the plurality of independent sequences are the same or different, when the group hopping function is off while the sequence hopping function is on, the sequence hopping patterns of the plurality of independent sequences are the same or different, and the independent sequence is a DM RS sequence on a section of bandwidth or a sequence formed collectively from DM RS sequences on multiple sections of bandwidth.

The apparatus might also have the following feature: the DM RS sequence sent by the apparatus satisfies the following conditions: if base sequences of two independent sequences come from the same group and have the same cyclic shift quantity, and lengths of the two independent sequences are the same and greater than or equal to $6N_{sc}^{RB}$, where $N_{sc}^{RB}$ is the number of subcarriers occupied by one physical resource block in frequency domain, then the intragroup sequence serial numbers $v_i,v_j \in \{0,1\}$ of the two independent sequences satisfy $v_i=(v_j+1) \mod 2$; if the group hopping function is off while the sequence hopping function is on, sequence hopping patterns of the two independent sequences satisfy $v_i(n_s)=(v_j(n_s)+1) \mod 2$, and each of the independent sequences is a DM RS sequence on a section of bandwidth or a sequence formed collectively from DM RS sequences on multiple sections of bandwidth.

The apparatus might also have the following feature: the DM RS sequence sent by the apparatus satisfies the following conditions: when the DM RS sequence on the section of bandwidth is an independent sequence, the DM RS sequence $r^{PUSCH}(\bullet)$ on the section of bandwidth is:

$$r^{PUSCH}(m \cdot M_{sc}^{RS}+n)=r_{u,v}^{(\alpha)}(n)$$

where $m=0,1$ $n=0,\ldots,M_{sc}^{RS}-1$ and the sequence length $M_{sc}^{RS}$ is the number of subcarriers $M_{sc}^{PUSCH}$ corresponding to the section of bandwidth, m=0, 1 correspond to two slots in one subframe respectively, α is the cyclic shift quantity, u is the group serial number, and v is the intragroup sequence serial number.

The apparatus might also have the following feature: the DM RS sequence sent by the apparatus satisfies the following conditions: when DM RS sequences on R sections of bandwidth are part of the independent sequence $r^{PUSCH}(\bullet)$, $r^{PUSCH}(\bullet)$ is $$r^{PUSCH}(m \cdot M_{sc}^{RS}+n)=r_{u,v}^{(\alpha)}(n)$$

where $m=0,1$ $n=0,\ldots,M_{sc}^{RS}-1$ and $M_{sc}^{RS}=M_{sc}^{PUSCH}$ where $r_{u,v}(n)$ is the base sequence, α is the cyclic shift quantity, u is the group serial number, v is the intragroup sequence serial number; m=0,1 correspond to two slots in a subframe respectively, and $M_{sc}^{PUSCH}$ is the total number of subcarriers corresponding to the R sections of bandwidth.

The DM RS sequence $r^{PUSCH,r}(\bullet)$ on the $r^{th}$ section of bandwidth of the R sections of bandwidths is:

$$r^{PUSCH,r}(m \cdot M_{sc}^{PUSCH,r} + n) = r^{PUSCH}\left(m \cdot M_{sc}^{RS} + \sum_{i=0}^{r-1} M_{sc}^{PUSCH,i} + n\right)$$

where $r=1,\ldots,R-1$ $m=0,1$ $n=0,\ldots,M_{sc}^{PUSCH,r}-1$ the DM RS sequence $r^{PUSCH,0}(\bullet)$ on the $0^{th}$ section of bandwidth is:

$$r^{PUSCH,0}(m \cdot M_{sc}^{PUSCH,0}+n)=r^{PUSCH}(m \cdot M_{sc}^{RS}+n)$$

where $m=0,1$ $n=0,\ldots,M_{sc}^{PUSCH,0}-1$ $M_{sc}^{PUSCH,r}$ is the number of subcarriers corresponding to the $r^{th}$ section of bandwidth.

The apparatus might also have the following feature: the apparatus is further configured to: after the sequence $r^{PUSCH}(\bullet)$ is multiplied by a magnitude scaling factor $\beta_{PUSCH}$, starting with $r^{PUSCH}(0)$ map the sequence $r^{PUSCH}(\bullet)$ to the same physical resource block set for corresponding PUSCH transmission, and when the sequence $r^{PUSCH}(\bullet)$ is mapped to RE (k,l) of a subframe, perform the mapping first in frequency domain and then in time-domain in an ascending order of k and l, the DM RS for the PUSCH in each slot being located at the fourth one (l=3) of seven normal cyclic prefix symbols or the third one (l=2) of six extended cyclic prefix symbols.

The method and apparatus for transmitting reference signals in accordance with the present invention solve the problem of transmitting demodulation reference signals (DM RS) of the PUSCH when a plurality of component carriers aggregate as well as the problem of transmitting the DM RSs during PUSCH non-continuous resource allocation in one component carrier in the LTE-A system.

BRIEF DESCRIPTION OF DRAWINGS

The accompanying drawings, which provide further understanding of the present invention and form a part of the specification, are used to explain the present invention along with the embodiments of the present invention and are not intended to limit the present invention. In the accompanying drawings.

PREFERRED EMBODIMENTS OF THE PRESENT INVENTION

Figure 1:
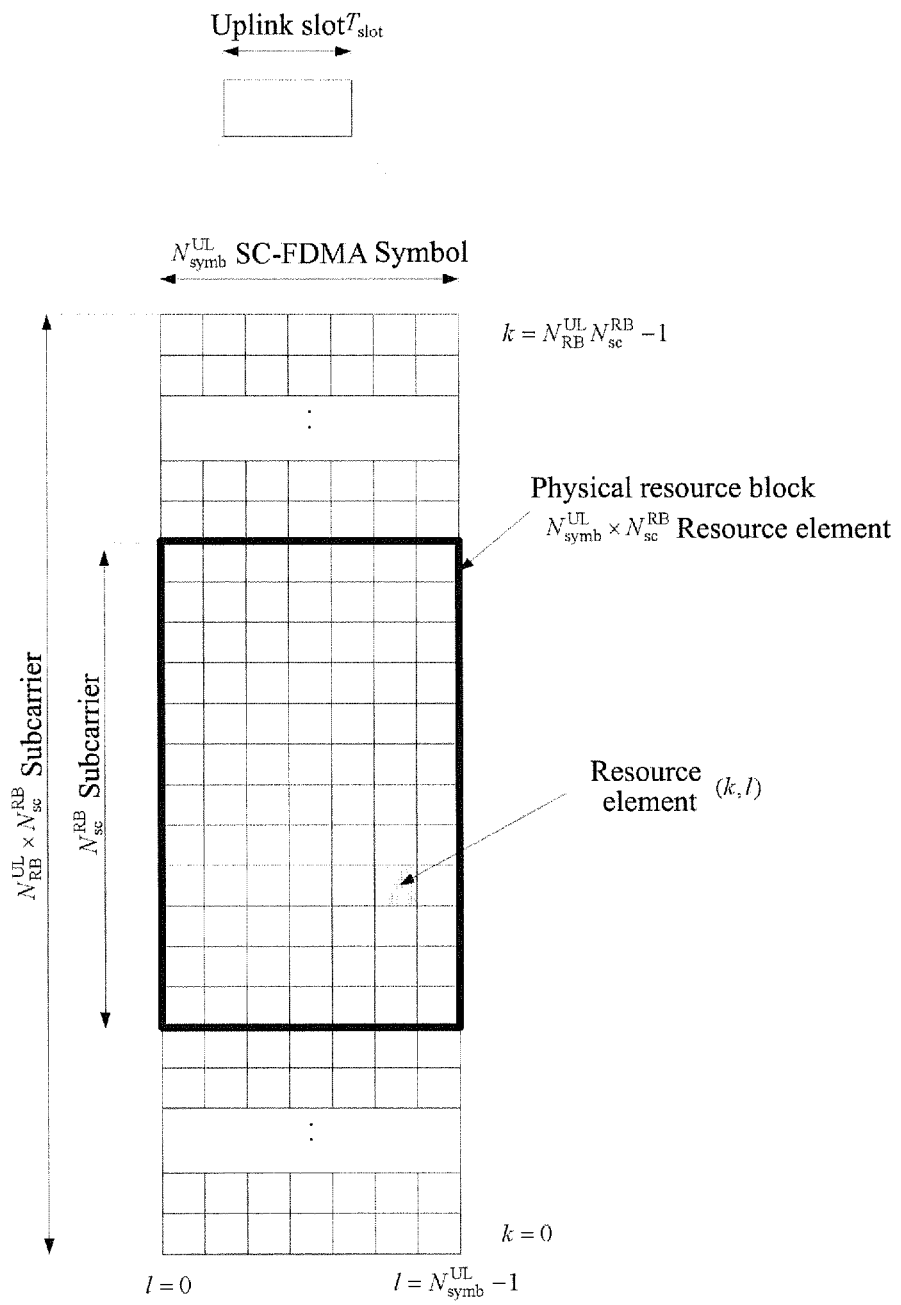
FIG. 1 is a structural diagram of a physical resource block in the LTE system (taking the normal cyclic prefix as example)
Figure 2:
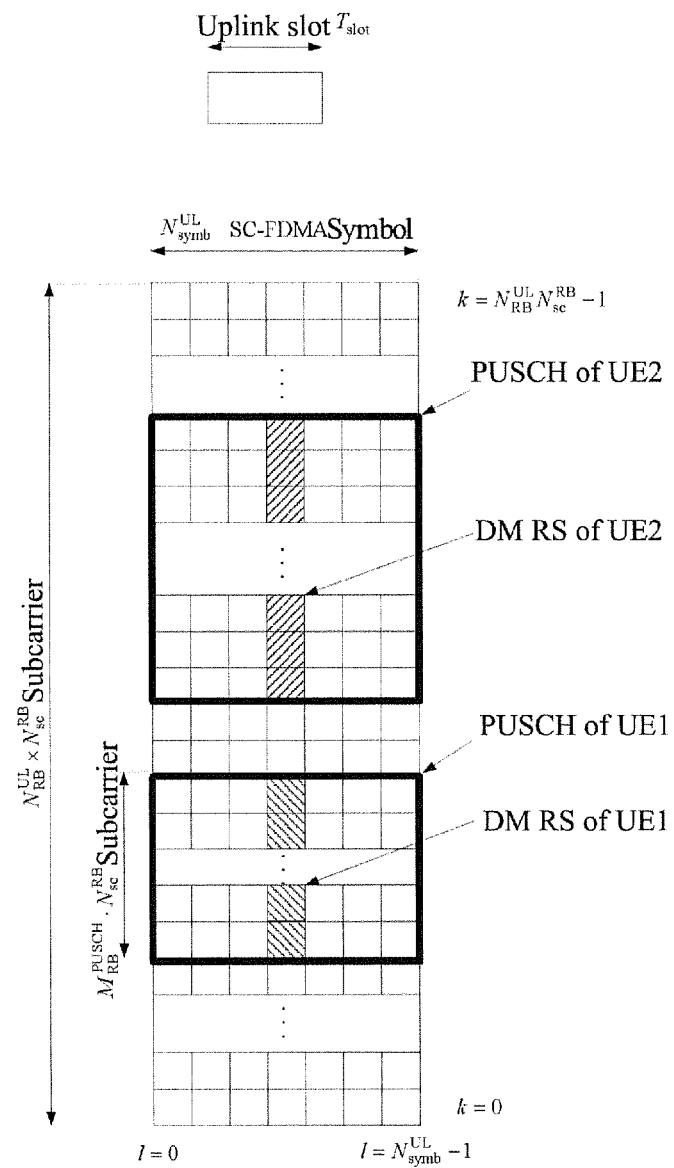
FIG. 2 is a structural diagram of a physical uplink shared channel in the LTE system (taking the normal cyclic prefix as example)
Figure 3:
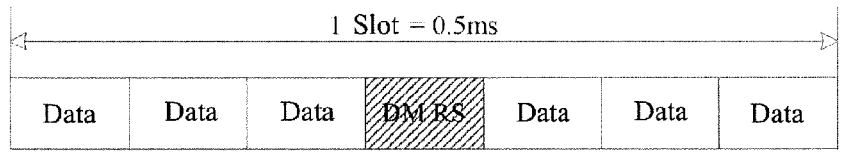
FIG. 3 is a diagram of a slot location of a demodulation reference signal of the physical uplink shared channel in the LTE system.
Figure 3:
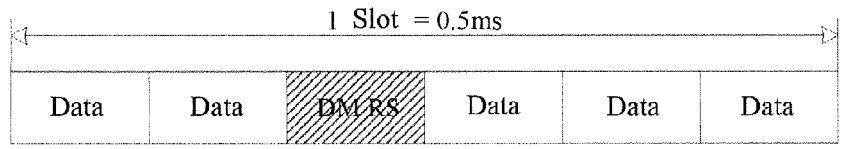
Figure 4:
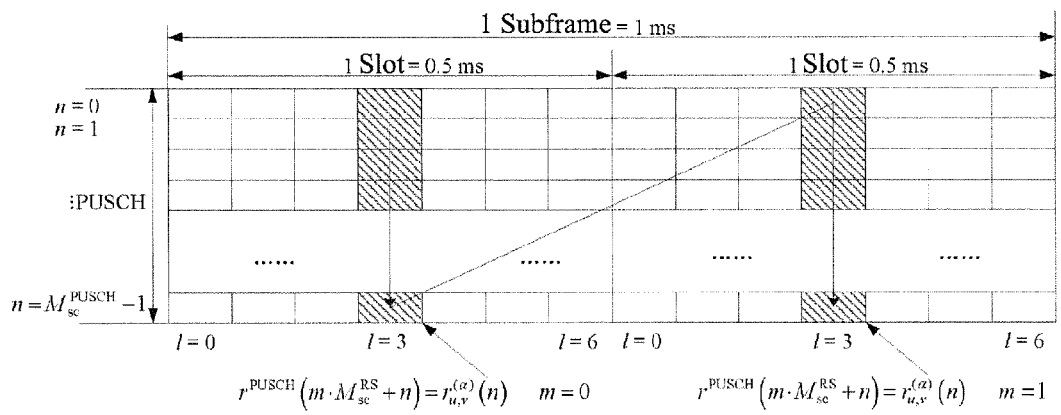
FIG. 4 is a structural diagram of a demodulation reference signal of the physical uplink shared channel in the LTE system (taking the normal cyclic prefix as example)
Figure 5:
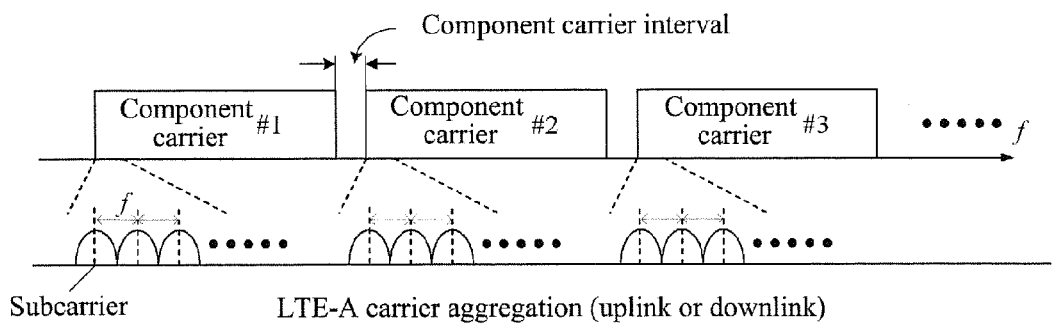
FIG. 5 is a diagram of carrier aggregation in the LTE-A system.

The method for transmitting reference signals in accordance with the present invention will be described below.

During carrier aggregation, a user equipment sends the physical uplink shared channel (PUSCH) on one or more component carriers, and sends demodulation reference signals (DM RS) for the PUSCH on each section of bandwidth occupied by the PUSCH on each component carrier, wherein a DM RS sequence on a section of bandwidth is an independent sequence or part of an independent sequence and forms an independent sequence with DM RS sequences on multiple sections of bandwidth other than the section of bandwidth; the section of bandwidth is a section of continuous bandwidth occupied by the PUSCH on any component carrier, or is any of the multiple sections of bandwidth occupied by the PUSCH on any component carrier.

The specific possible situations will be described below.

1) A DM RS sequence on each section of bandwidth is an independent sequence.

When a user equipment sends the PUSCH on a plurality of component carriers, for each of the plurality of component carriers, when the PUSCH on the component carrier occupies a section of continuous bandwidth, the DM RS sequence on the section of continuous bandwidth is an independent sequence; when the PUSCH on the component carrier occupies multiple sections of bandwidth, the DM RS sequence on each of the multiple sections of bandwidth occupied by the PUSCH on the component carrier is an independent sequence. When the PUSCH on each component carrier occupies a section of continuous bandwidth, the DM RS sequence on each component carrier is an independent sequence.

When the UE sends the PUSCH on a component carrier, and the PUSCH on this component carrier occupies multiple sections of bandwidth, the DM RS sequence on each of the multiple sections of bandwidth occupied by the PUSCH on the component carrier is an independent sequence.

2) A DM RS sequence on part of bandwidth is part of an independent sequence. DM RS sequences on multiple sections of bandwidth form an independent sequence. The DM RS sequence on part of bandwidth is the independent sequence means that:

a) A DM RS sequence on the same component carrier is an independent sequence.

When a user equipment sends the PUSCH on a plurality of component carriers, for each of the plurality of component carriers, when the PUSCH on the component carrier occupies a section of continuous bandwidth, the DM RS sequence on the section of continuous bandwidth is an independent sequence; when the PUSCH on the component carrier occupies multiple sections of bandwidth, DM RS sequences on the multiple sections of bandwidth occupied by the PUSCH on the component carrier form an independent sequence, and the DM RS sequence on each section of bandwidth is part of the independent sequence. The following special case is excluded: when the PUSCH on each component carrier occupies a section of continuous bandwidth, the DM RS sequence on each component carrier is an independent sequence. This specific case is included in (1).

When the UE sends the PUSCH on a component carrier, and the PUSCH on the component carrier occupies multiple sections of bandwidth, DM RS sequences on the multiple sections of bandwidth occupied by the PUSCH on the component carrier form an independent sequence, and the DM RS sequence on each section of bandwidth is part of the independent sequence.

b) At least a DM RS sequence on one component carrier is part of an independent sequence, and at least a DM RS sequence on one section of bandwidth is an independent sequence.

For example, each of the PUSCHs on two component carriers occupies a section of continuous bandwidth, and DM RS sequences on two sections of bandwidth form an independent sequence, the PUSCH on another component carrier occupies a section of continuous bandwidth, on which a DM RS sequence is an independent sequence.

As another example, the PUSCH on a component carrier occupies three sections of bandwidth, on two of which DM RS sequences form an independent sequence, and a DM RS sequence on the third section of bandwidth is an independent sequence.

The above description is only exemplary.

3) DM RS sequences on all sections of bandwidth form an independent sequence.

That is, when the UE sends the PUSCH on one or more component carriers, a DM RS sequence on each of all sections of bandwidth occupied by the PUSCH on each component carrier is part of the same independent sequence.

A cyclic shift quantity α of the DM RS sequence on each section of bandwidth might be the same or different.

A base sequence of the DM RS sequence on each section of bandwidth may come from the same group, that is, have the same group serial number u; or come from a different group, that is, have the different group serial number u. If the group hopping function is on, a group hopping pattern of the DM RS sequence on each section of bandwidth might be the same or different.

When the length of the independent sequence consisting of one or more DM RS sequences satisfies $M_{sc}^{RS} < 6N_{sc}^{RB}$, there is only one base sequence of the independent sequence with this length in each group, the intragroup sequence serial number of the base sequence of the independent sequence is v=0; when the length of the independent sequence consisting of one or more DM RS sequences satisfies $M_{sc}^{RS} \geq 6N_{sc}^{RB}$, there are two base sequences of the independent sequence with this length in each group, the intragroup sequence serial numbers of the base sequences of the independent sequences are v=0, 1.

In the same slot, if base sequences of a plurality of independent sequences come from the same group and have the same cyclic shift quantity, and their sequence lengths are the same and satisfy $M_{sc}^{RS} \geq 6N_{sc}^{RB}$, the intragroup sequence serial number v of the base sequences of the plurality of independent sequences might be the same or different. If the group hopping function is off while the sequence hopping function is on, sequence hopping patterns of the plurality of independent sequences might be the same or different, each of the independent sequences is a DM RS sequence on a section of bandwidth or a sequence formed collectively from DM RS sequences on multiple sections of bandwidth.

Specifically, if base sequences of two independent sequences come from the same group and have the same cyclic shift quantity, and the lengths of the two independent sequences are the same and greater than or equal to $6N_{sc}^{RB}=72$, then the intragroup sequence serial numbers $v_i, v_j \in \{0, 1\}$ of these two independent sequences satisfy:

$$v_i = (v_j + 1) \bmod 2$$

If the group hopping function is off while the sequence hopping function is on, sequence hopping patterns of the two independent sequences satisfy:

$$v_i(n_s) = (v_j(n_s) + 1) \bmod 2$$

The independent sequence is a DM RS sequence on a section of bandwidth or a sequence formed collectively from DM RS sequences on multiple sections of bandwidth.

When a DM RS sequence on a section of bandwidth is an independent sequence, the DM RS sequence $r^{PUSCH}(\bullet)$ on the section of bandwidth is:

$$r^{PUSCH}(m \cdot M_{sc}^{RS} + n) = r_{u,v}^{(\alpha)}(n)$$

where $$m=0,1$$

$$n=0, \ldots, M_{sc}^{RS}-1$$

and the sequence length $M_{sc}^{RS}$ is the number of subcarriers $M_{sc}^{PUSCH}$ corresponding to the section of bandwidth, that is:

$$M_{sc}^{RS} = M_{sc}^{PUSCH}$$

m=0,1 correspond to two slots in one subframe respectively.

After the sequence $r^{PUSCH}(\bullet)$ is multiplied by a magnitude scaling factor $\beta_{PUSCH}$, starting with $r^{PUSCH}(0)$, the sequence $r^{PUSCH}(\bullet)$ is mapped to the same physical resource block set for corresponding PUSCH transmission. When the sequence $r^{PUSCH}(\bullet)$ is mapped to RE (k,l) of a subframe, the mapping is performed first in frequency domain (k) and then in time-domain (l) in an ascending order of k and l. The DM RS for the PUSCH in each slot is located at the fourth one (l=3) of seven normal cyclic prefix symbols or the third one (l=2) of six extended cyclic prefix symbols.

When a DM RS sequence on each of R sections of bandwidth is a part of an independent sequence $r^{PUSCH}(\bullet)$, $r^{PUSCH}(\bullet)$ is defined as $$r^{PUSCH}(m \cdot M_{sc}^{RS}+n)=r_{u,v}^{(\alpha)}(n)$$

where $m=0,1$ $n=0,\ldots,M_{sc}^{RS}-1$ and the sequence length $M_{sc}^{RS}$ is the number of subcarriers $M_{sc}^{PUSCH}$ corresponding to the R sections of bandwidth, that is:

$$M_{sc}^{RS}=M_{sc}^{PUSCH}$$

where $M_{sc}^{PUSCH}=M_{RB}^{PUSCH} \cdot N_{sc}^{RB}$, $$M_{RB}^{PUSCH} = \sum_{r=0}^{R-1} M_{RB}^{PUSCH,r}.$$

$M_{RB}^{PUSCH,r}$ is the number of PRBs corresponding to the $r^{th}$ section of bandwidth. The number of subcarriers corresponding to the $r^{th}$ section of bandwidth is $$M_{sc}^{PUSCH,r}=M_{RB}^{PUSCH,r} \cdot N_{sc}^{RB}$$

and $$\sum_{r=0}^{R-1} M_{sc}^{PUSCH,r} = M_{sc}^{PUSCH}$$

m=0,1 correspond to two slots in one subframe (1 ms) respectively.

The DM RS sequence $r^{PUSCH,r}(\bullet)$ on the $r^{th}$ section of bandwidth is:

$$r^{PUSCH,r}(m \cdot M_{sc}^{PUSCH,r} + n) = r^{PUSCH}\left(m \cdot M_{sc}^{RS} + \sum_{i=0}^{r-1} M_{sc}^{PUSCH,i} + n\right)$$

where $r=1,\ldots,R-1$ $m=0,1$ $n=0,\ldots,M_{sc}^{PUSCH,r}-1$

Specifically, the DM RS sequence $r^{PUSCH,0}(\bullet)$ on the $0^{th}$ section of bandwidth is:

$$r^{PUSCH,0}(m \cdot M_{sc}^{PUSCH,0}+n)=r^{PUSCH}(m \cdot M_{sc}^{RS}+n)$$

where $m=0,1$ $n=0,\ldots,M_{sc}^{PUSCH,0}-1$

That is, the sequence $r^{PUSCH}(\bullet)$ is divided into R sections, and the $r^{th}$ section of the sequence corresponds to the $r^{th}$ section of bandwidth, or other corresponding modes may be used. The length of the $r^{th}$ section of the sequence is the number of subcarriers $M_{sc}^{PUSCH,r}$ corresponding to the $r^{th}$ section of bandwidth. The R sections of bandwidth might be R sections of bandwidth on one component carrier; or R sections of bandwidth on R component carriers (a section of continuous bandwidth on each component carrier), or R sections of bandwidth on P component carriers, where P<R, that is, the PUSCH on at least one component carrier occupies multiple sections of non-continuous bandwidth.

After the sequence $r^{PUSCH}(\bullet)$ is multiplied by a magnitude scaling factor $\beta_{PUSCH}$, starting with $r^{PUSCH}(0)$, the sequence $r^{PUSCH}(\bullet)$ is mapped to the same physical resource block set for corresponding PUSCH transmission. When the sequence $r^{PUSCH}(\bullet)$ is mapped to RE (k,l) of a subframe, the mapping is performed first in frequency domain (k) and then in time-domain (l) in an ascending order of k and l. The DM RS for the PUSCH in each slot is located at the fourth one (l=3) of seven normal CP symbols or the third one (l=2) of six extended CP symbols.

The present invention will be described in detail below in conjunction with the embodiments and the accompanying drawings.

The First Embodiment

Figure 6:
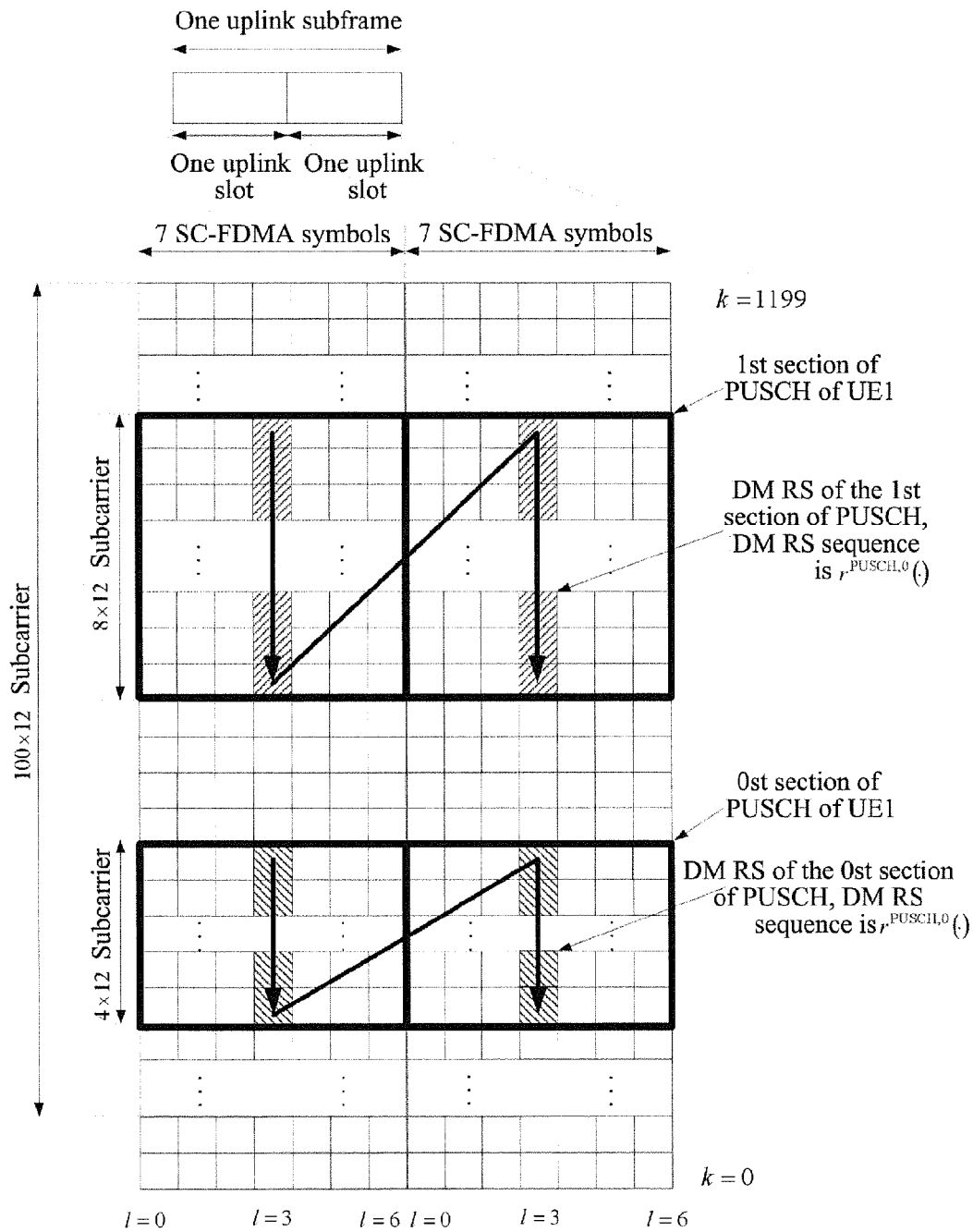
FIG. 6 is a structural diagram of a demodulation reference signal in accordance with the first embodiment of the present invention.

As shown in FIG. 6, assuming that in the LTE-A system, the PUSCH of a user equipment 1 is transmitted on a component carrier, and the uplink system bandwidth of this component carrier is 20 MHz, corresponds to 12 PRBs and 144 subcarriers in frequency domain, and is divided into two sections of non-continuous bandwidth in frequency domain using non-continuous resource allocation, the two sections of bandwidth corresponding to 4 PRBs and 48 subcarriers and 8 PRBs and 96 subcarriers respectively.

The user equipment 1 transmits demodulation reference signals (DM RS) for the PUSCH on the two sections of bandwidth occupied by the PUSCH of the user equipment 1.

The DM RSs on each section of bandwidth are an independent sequence.

The DM RS sequence $r^{PUSCH,0}(\bullet)$ on the $0^{th}$ section of bandwidth is defined as $$r^{PUSCH,0}(m \cdot M_{sc}^{RS}+n)=r_{u,v_0}^{(\alpha)}(n)$$

where $m=0,1$ $n=0,\ldots,M_{sc}^{RS}-1$

The sequence length is the number of subcarriers corresponding to the section of bandwidth:

$$M_{sc}^{RS}=M_{sc}^{PUSCH,0}=48$$

m=0,1 correspond to two slots in a subframe (1 ms) respectively.

After the sequence $r^{PUSCH}(\bullet)$ is multiplied by a magnitude scaling factor $\beta_{PUSCH}$, starting with $r^{PUSCH}(0)$, the sequence $r^{PUSCH}(\bullet)$ is mapped to the same physical resource block set for corresponding to the $0^{th}$ section of the PUSCH transmission. When the sequence $r^{PUSCH}(\bullet)$ is mapped to RE (k,l) of a subframe, the mapping is performed first in frequency domain (k) and then in time-domain (l) in an ascending order of k and l. The DM RS for the PUSCH in each slot is located at the fourth one (l=3) of seven normal CP symbols.

The DM RS sequence $r^{PUSCH,1}(\bullet)$ of the first section of bandwidth is defined as $$r^{PUSCH,1}(m \cdot M_{sc}^{RS}+n)=r_{u,v_1}^{(\alpha)}(n)$$

where $m=0,1$ $n=0,\ldots,M_{sc}^{RS}-1$

The sequence length is the number of subcarriers corresponding to the section of bandwidth:

$$M_{sc}^{RS} = M_{sc}^{PUSCH,1} = 96$$

m=0,1 correspond to two slots in a subframe (1 ms) respectively.

After the sequence $r^{PUSCH}(\bullet)$ is multiplied by a magnitude scaling factor starting with $r^{PUSCH}(0)$, the sequence $r^{PUSCH}(\bullet)$ is mapped to the same physical resource block set for corresponding the 1$^{st}$ section of the PUSCH transmission. When the sequence $r^{PUSCH}(\bullet)$ is mapped to RE (k,l) of a subframe, the mapping is performed first in frequency domain (k) and then in time-domain (l) in an ascending order of k and l. The DM RS for the PUSCH in each slot is located at the fourth one (l=3) of seven normal CP symbols.

The cyclic shift quantities α of the DM RS sequences on the two sections of bandwidth are the same, and the group serial numbers u of the base sequences are the same. If the group hopping function is on, the group serial numbers u of the DM RS sequences on the two sections of bandwidth vary with the slot $n_s$=0, 1, . . . , 19 in one radio frame, and group hopping patterns are the same.

The length of the DM RS sequence on the 0$^{th}$ section of bandwidth is $M_{sc}^{RS}$=48<6$N_{sc}^{RB}$=72, the intragroup sequence serial number of the base sequence is $v_0$=0; the length of the DM RS sequence on the 1$^{st}$ section of bandwidth is $M_{sc}^{RS}$=96>6$N_{sc}^{RB}$=72, the intragroup sequence serial number of the base sequence is $v_1$=0 or 1. If the group hopping function is off, and the sequence hopping function is on, the intragroup sequence serial number $v_1$ of the DM RS sequence on the first section of bandwidth varies with the slot $n_s$=0, 1, . . . , 19 in one radio frame.

The PUSCH of the UE1 is not frequency hopping in this subframe, and the PUSCH is located at the same frequency domain position in two slots in the subframe. Therefore, the corresponding DM RSs are also located at the same frequency domain position in the two slots in the subframe.

The Second Embodiment

Figure 7:
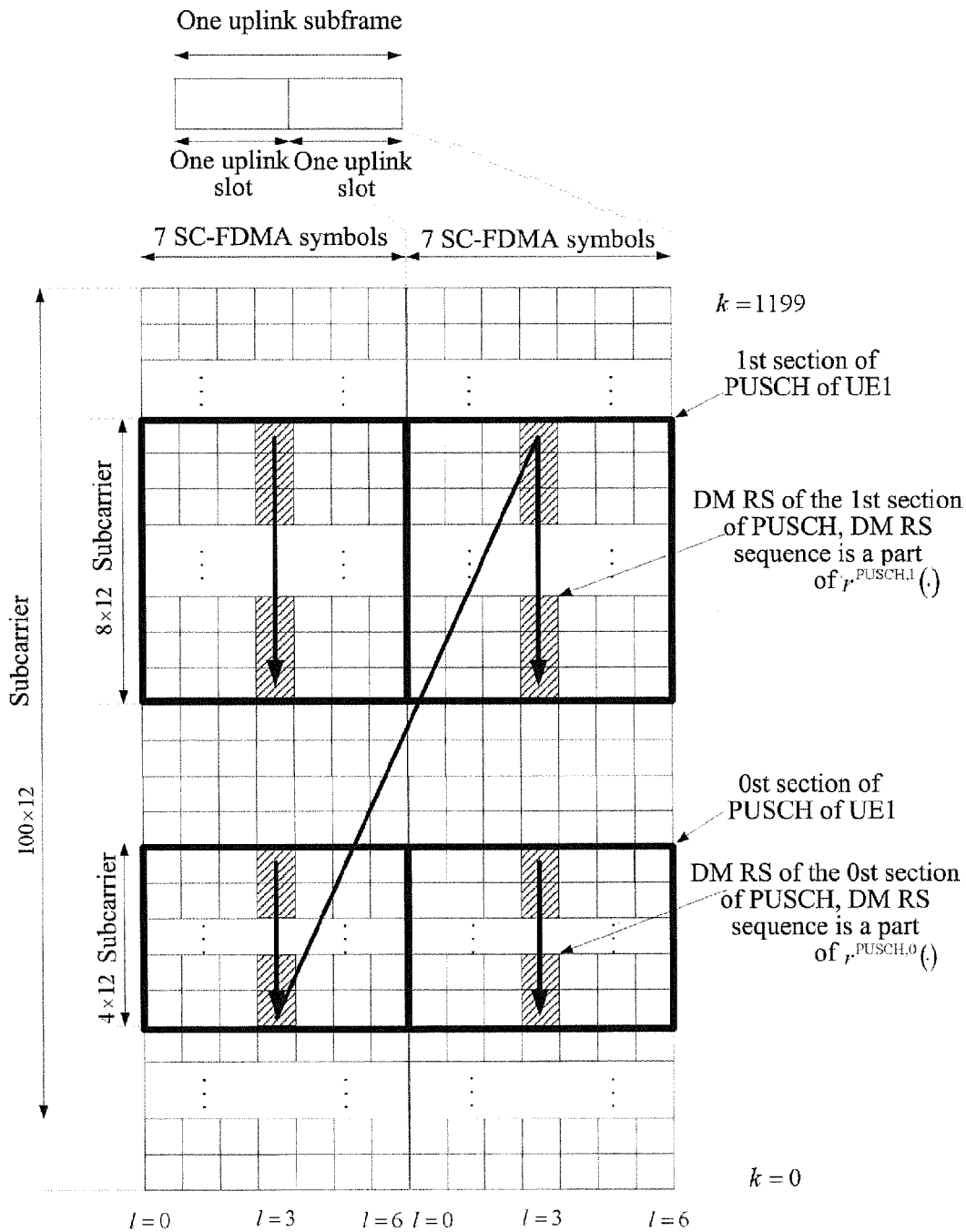
FIG. 7 is a structural diagram of a demodulation reference signal in accordance with the second embodiment of the present invention.

As shown in FIG. 7, assuming that in the LTE-A system, the PUSCH of a user equipment 1 is transmitted on a component carrier, and the uplink system bandwidth of this component carrier is 20 MHz, corresponds to 12 PRBs and 144 subcarriers in frequency domain, and is divided into two sections of non-continuous bandwidth in frequency domain using non-continuous resource allocation, the two sections of bandwidth corresponding to 4 PRBs and 48 subcarriers and 8 PRBs and 96 subcarriers respectively.

The UE1 transmits demodulation reference signals (DM RS) for the PUSCH on the two sections of bandwidth occupied by the PUSCH of the UE1.

The DM RSs on each section of bandwidth are a part of an independent sequence $r^{PUSCH}(\bullet)$, and $r^{PUSCH}(\bullet)$ is defined as $$r^{PUSCH}(m \cdot M_{sc}^{RS}+n) = r_{u,v}^{(\alpha)}(n)$$

where $m=0,1$ $n=0, \ldots, M_{sc}^{RS}-1$ and $M_{sc}^{RS}=144$ m=0,1 correspond to two slots in a subframe (1 ms) respectively.

The DM RS sequence $r^{PUSCH,0}(\bullet)$ on the 0$^{th}$ section of bandwidth is $$r^{PUSCH,0}(m \cdot M_{sc}^{PUSCH,0}+n) = r^{PUSCH}(m \cdot M_{sc}^{RS}+n)$$

where $m=0,1$ $n=0, \ldots, M_{sc}^{RS}-1$ and $M_{sc}^{PUSCH,0}=48$

The DM RS sequence $r^{PUSCH,1}(\bullet)$ on the first section of bandwidth is defined as $$r^{PUSCH,1}(m \cdot M_{sc}^{PUSCH,1}+n) = r^{PUSCH}(m \cdot M_{sc}^{RS}+M_{sc}^{PUSCH,0}+n)$$

where $m=0,1$ $n=0, \ldots, M_{sc}^{PUSCH,1}-1$ and $M_{sc}^{PUSCH,1}=96$ that is, the sequence $r^{PUSCH}(\bullet)$ is divided into two sections, the length of the 0$^{th}$ section of the sequence is the number 48 of subcarriers corresponding to the 0$^{th}$ section of the PUSCH, and the length of the first section of the sequence is the number 96 of subcarriers corresponding to the first section of the PUSCH.

After the sequence $r^{PUSCH}(\bullet)$ is multiplied by a magnitude scaling factor $\beta_{PUSCH}$, starting with $r^{PUSCH}(0)$, the sequence $r^{PUSCH}(\bullet)$ is mapped to the same physical resource block set for corresponding PUSCH transmission. When the sequence $r^{PUSCH}(\bullet)$ is mapped to RE (k,l) of a subframe, the mapping is performed first in frequency domain (k) and then in time-domain (l) in an ascending order of k and l. The DM RS for the PUSCH in each slot is located at the fourth one (l=3) of seven normal CP symbols.

If the group hopping function is on, the group serial number u of the DM RS sequence varies with the slot $n_s$=0, 1, . . . , 19 in one radio frame.

The length of the DM RS sequence is $M_{sc}^{RS}$=144>6$N_{sc}^{RB}$=72, the intragroup sequence serial number of the base sequence is v=0 or 1. If the group hopping function is off, and the sequence hopping function is on, v varies with the slot $n_s$=0, 1, . . . , 19 in one radio frame.

The PUSCH of the UE1 is not frequency hopping in the subframe, the PUSCH is located at the same frequency domain location in two slots in the subframe. Therefore, the corresponding DM RSs are also located at the same frequency domain location in the two slots in the subframe.

The Third Embodiment

Figure 8:
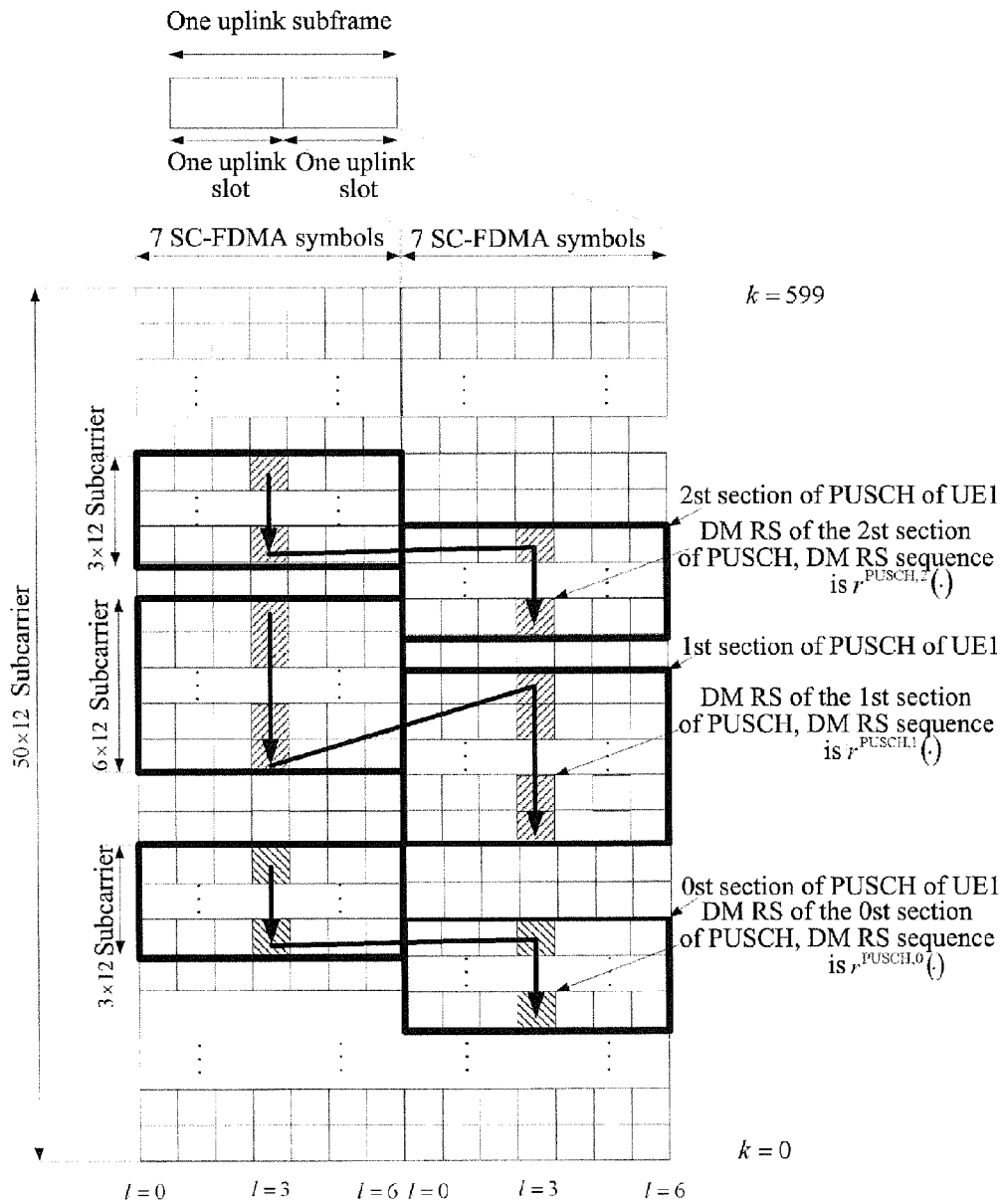
FIG. 8 is a structural diagram of a demodulation reference signal in accordance with the third embodiment of the present invention.

As shown in FIG. 8, assuming that in the LTE-A system, the PUSCH of a user equipment 1 is transmitted on a component carrier, and the uplink system bandwidth of this component carrier is 10 MHz, corresponds to 24 PRBs and 288 subcarriers in frequency domain, and is divided into three sections of non-continuous bandwidth in frequency domain using non-continuous resource allocation, the three sections of bandwidth corresponding to 6 PRBs and 72 subcarriers, 12 PRBs and 144 subcarriers and 6 PRBs and 72 subcarriers respectively.

The UE1 transmits demodulation reference signals (DM RS) for the PUSCH on the three sections of bandwidth occupied by the PUSCH of the UE1.

The DM RSs on each section of bandwidth are an independent sequence.

The DM RS sequence $r^{PUSCH,0}(\cdot)$ on the $0^{th}$ section of bandwidth is defined as $$r^{PUSCH,0}(m \cdot M_{sc}^{RS}+n) = r_{u,v_0}^{(\alpha)}(n)$$

where $m=0,1$ $n=0,\ldots,M_{sc}^{RS}-1$ the sequence length is the number of subcarriers corresponding to the section of bandwidth:

$$M_{sc}^{RS} = M_{sc}^{PUSCH,0} = 72$$

m=0,1 correspond to two slots in a subframe (1 ms) respectively.

After the sequence $r^{PUSCH}(\cdot)$ is multiplied by a magnitude scaling factor $\beta_{PUSCH}$, starting with $r^{PUSCH}(0)$ the sequence $r^{PUSCH}(\cdot)$ is mapped to the same physical resource block set for corresponding the $0^{th}$ section of the PUSCH transmission. When the sequence $r^{PUSCH}(\cdot)$ is mapped to RE (k,l) of a subframe, the mapping is performed first in frequency domain (k) and then in time-domain (l) in an ascending order of k and l. The DM RS for the PUSCH in each slot is located at the fourth one (l=3) of seven normal CP symbols.

The DM RS sequence $r^{PUSCH,1}(\cdot)$ on the first section of bandwidth is defined as $$r^{PUSCH,1}(m \cdot M_{sc}^{RS}+n) = r_{u,v_1}^{(\alpha)}(n)$$

where $m=0,1$ $n=0,\ldots,M_{sc}^{RS}-1$ the sequence length is the number of subcarriers corresponding to the section of bandwidth:

$$M_{sc}^{RS} = M_{sc}^{PUSCH,1} = 144$$

m=0,1 correspond to two slots in a subframe (1 ms) respectively.

After the sequence $r^{PUSCH}(\cdot)$ is multiplied by a magnitude scaling factor $\beta_{PUSCH}$, starting with $r^{PUSCH}(0)$, the sequence $r^{PUSCH}(\cdot)$ is mapped to the same physical resource block set for corresponding the $1^{st}$ section of the PUSCH transmission. When the sequence $r^{PUSCH}(\cdot)$ is mapped to RE (k,l) of a subframe, the mapping is performed first in frequency domain (k) and then in time-domain (l) in an ascending order of k and l. The DM RS for the PUSCH in each slot is located at the fourth one (l=3) of seven normal CP symbols.

The DM RS sequence $r^{PUSCH,2}(\cdot)$ on the second section of bandwidth is defined as $$r^{PUSCH,2}(m \cdot M_{sc}^{RS}+n) = r_{u,v_2}^{(\alpha)}(n)$$

where $m=0,1$ $n=0,\ldots,M_{sc}^{RS}-1$ the sequence length is the number of subcarriers corresponding to the section of bandwidth:

$$M_{sc}^{RS} = M_{sc}^{PUSCH,2} = 72$$

m=0,1 correspond to two slots in a subframe (1 ms) respectively.

After the sequence $r^{PUSCH}(\cdot)$ is multiplied by a magnitude scaling factor $\beta_{PUSCH}$, starting with $r^{PUSCH}(0)$, the sequence $r^{PUSCH}(\cdot)$ is mapped to the same physical resource block set for corresponding the $2^{nd}$ section of the PUSCH transmission. When the sequence $r^{PUSCH}(\cdot)$ is mapped to RE (k,l) of a subframe, the mapping is performed first in frequency domain (k) and then in time-domain (l) in an ascending order of k and l. The DM RS for the PUSCH in each slot is located at the fourth one (l=3) of seven normal CP symbols.

The cyclic shift quantities α of the DM RS sequences on three sections of bandwidth are the same, and the group serial numbers u of the base sequences are the same. If the group hopping function is on, the group serial numbers u of the DM RS sequences on these three sections of bandwidth vary with the slot $n_s=0, 1, \ldots, 19$ in one radio frame, and group hopping patterns are the same.

The lengths of the DM RS sequences on these three sections of bandwidth satisfy $M_{sc}^{RS} \geq 6N_{sc}^{RB}=72$, the intragroup sequence serial number of the base sequence is 0 or 1. The lengths of the DM RS sequences on the $0^{th}$ and $2^{nd}$ sections of bandwidth are the same, and in one slot, the intragroup sequence serial numbers of the DM RS sequences on the two sections of bandwidth are different, $v_0 \neq v_2$.

If the group hopping function is off, and the sequence hopping function is on, the intragroup sequence serial numbers of the DM RS sequences on the three sections of bandwidth vary with the slot $n_s=0, 1, \ldots, 19$ in one radio frame. The sequence hopping pattern of the DM RSs on the $0^{th}$ section of bandwidth is different from and just contrary to that of the DM RSs on the $2^{nd}$ section of bandwidth, that is, $$v_0(n_s) = (v_2(n_s)+1) \mod 2$$

The PUSCH of the UE1 is frequency hopping in the subframe, the PUSCH is located at the same frequency domain location in two slots in the subframe. Therefore, the corresponding DM RSs are also located at the same frequency domain location in the two slots in the subframe.

The Fourth Embodiment

Figure 9:
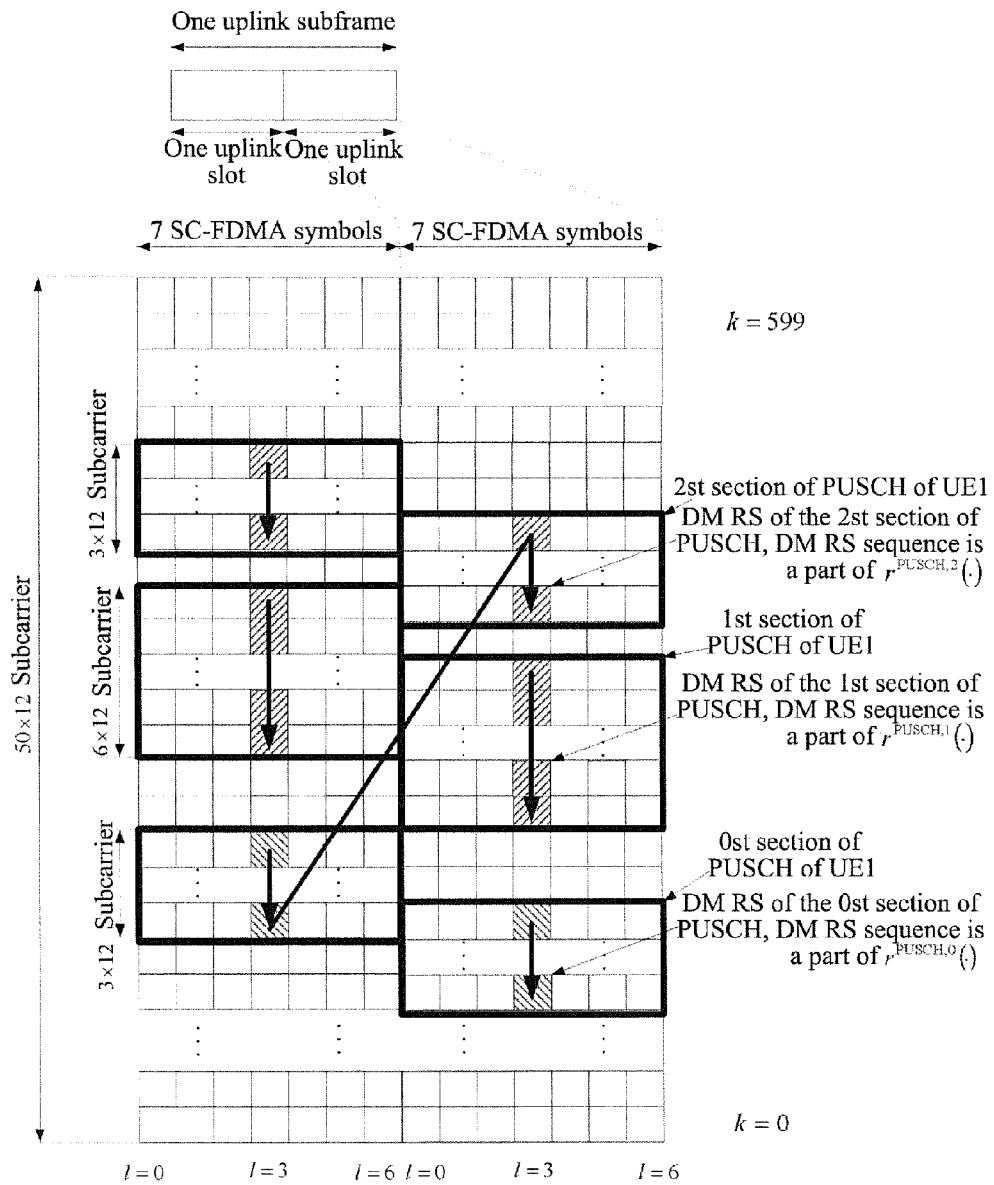
FIG. 9 is a structural diagram of a demodulation reference signal in accordance with the fourth embodiment of the present invention.

As shown in FIG. 9, assuming that in the LTE-A system, the PUSCH of a user equipment 1 is transmitted on a component carrier, and the uplink system bandwidth of this component carrier is 10 MHz, corresponds to 24 PRBs and 288 subcarriers in frequency domain, and is divided into three sections of non-continuous bandwidth in frequency domain using non-continuous resource allocation, the three sections of bandwidth corresponding to 6 PRBs and 72 subcarriers, 12 PRBs and 144 subcarriers and 6 PRBs and 72 subcarriers respectively.

The UE1 transmits demodulation reference signals (DM RS) for the PUSCH on the three sections of bandwidth occupied by the PUSCH of the UE1.

The DM RSs on each section of bandwidth is a part of an independent sequence $r^{PUSCH}(\cdot)$, and $r^{PUSCH}(\cdot)$ is defined as $$r^{PUSCH}(m \cdot M_{sc}^{RS}+n) = r_{u,v}^{(\alpha)}(n)$$

where $m=0,1$ $n=0,\ldots,M_{sc}^{RS}-1$ and $M_{sc}^{RS}=288$ m=0,1 correspond to two slots in a subframe (1 ms) respectively.

The DM RS sequence $r^{PUSCH,0}(\bullet)$ on the $0^{th}$ section of bandwidth is:

$$r^{PUSCH,0}(m \cdot M^{PUSCH,0} + n) = r^{PUSCH}(m \cdot M_{sc}^{RS} + +n)$$

where $m=0,1$ $n=0,\ldots,M_{sc}^{PUSCH,0}-1$ and $M_{sc}^{PUSCH,0}=72$

The DM RS sequence $r^{PUSCH,1}(\bullet)$ on the first section of bandwidth is $$r^{PUSCH,1}(m \cdot M_{sc}^{PUSCH,1} + n) = r^{PUSCH}(m \cdot M_{sc}^{RS} + M_{sc}^{PUSCH,0} + n)$$

where $m=0,1$ $n=0,\ldots,M_{sc}^{PUSCH,1}-1$ and $M_{sc}^{PUSCH,1}=144$ the DM RS sequence $r^{PUSCH,2}(\bullet)$ on the second section of bandwidth is $$r^{PUSCH,1}(m \cdot M_{sc}^{PUSCH2} + n) = r^{PUSCH}(m \cdot M_{sc}^{RS} + M_{sc}^{PUSCH,0} + M_{sc}^{PUSCH,1} + n)$$

where $m=0,1$ $n=0,\ldots,M_{sc}^{PUSCH,2}-1$ and $M_{sc}^{PUSCH,2}=72$

That is, the sequence $r^{PUSCH}(\bullet)$ is divided into three sections, the length of the $0^{th}$ section of the sequence is the number 36 of subcarriers corresponding to the $0^{th}$ section of the PUSCH, the length of the $1^{st}$ section of the sequence is the number 72 of subcarriers corresponding to the $1^{st}$ section of the PUSCH, and the length of the $2^{nd}$ section of the sequence is the number of subcarriers 36 corresponding to the $2^{nd}$ section of the PUSCH.

After the sequence $r^{PUSCH}(\bullet)$ is multiplied by a magnitude scaling factor $\beta_{PUSCH}$, starting with $r^{PUSCH}(0)$, the sequence $r^{PUSCH}(\bullet)$ is mapped to the same physical resource block set for corresponding PUSCH transmission. When the sequence $r^{PUSCH}(\bullet)$ is mapped to RE(k,l) of a subframe, the mapping is performed first in frequency domain (k) and then in time-domain (l) in an ascending order of k and l. The DM RS for the PUSCH in each slot is located at the fourth one (l=3) of seven normal CP symbols.

If the group hopping function is on, the group serial number u of the DM RS sequence varies with the slot $n_s=0, 1, \ldots, 19$ in one radio frame.

The length of the DM RS sequence satisfies $M_{sc}^{RS}=288>6N_{sc}^{RB}=72$, the intragroup sequence serial number of the base sequence is v=0 or 1. If the group hopping function is off, and the sequence hopping function is on, v varies with the slot $n_s=0, 1, \ldots, 19$ in one radio frame.

The PUSCH of the UE1 is frequency hopping in the subframe, the PUSCH is located at the same frequency domain location in two slots in the subframe. Therefore, the corresponding DM RSs are also located at the same frequency domain location in the two slots in the subframe.

The Fifth Embodiment

Assuming that in the LTE-A system, the PUSCH of a user equipment 1 is transmitted on three component carriers, and the uplink system bandwidths of the three component carriers are all 20 MHz, and correspond to 12 PRBs and 144 subcarriers, 8 PRBs and 96 subcarriers and 8 PRBs and 96 subcarriers in frequency domain respectively using continuous resource allocation in each component carrier.

In each component carrier, the UE1 transmits demodulation reference signals (DM RS) for the PUSCH on the bandwidth occupied by the PUSCH of the UE1. The DM RSs on each component carrier are an independent sequence.

The DM RS sequence $r_0^{PUSCH}(\bullet)$ on the $0^{th}$ component carrier is defined as $$r_0^{PUSCH}(m \cdot M_{sc}^{RS} + n) = r_{u_0,v_0}^{(\alpha_0)}(n)$$

where $m=0,1$ $n=0,\ldots,M_{sc}^{RS}-1$

The sequence length is the number of subcarriers corresponding to the bandwidth occupied by the PUSCH on the component carrier $$M_{sc}^{RS}=M_{sc}^{PUSCH}=144$$

m=0,1 correspond to two slots in a subframe (1 ms) respectively.

After the sequence $r^{PUSCH}(\bullet)$ is multiplied by a magnitude scaling factor $\beta_{PUSCH}$, starting with $r^{PUSCH}(0)$, the sequence $r^{PUSCH}(\bullet)$ is mapped to the same physical resource block set for corresponding the $0^{th}$ section of the PUSCH transmission. When the sequence $r^{PUSCH}(\bullet)$ is mapped to RE(k,l) of a subframe, the mapping is performed first in frequency domain (k) and then in time-domain (l) in an ascending order of k and l. The DM RS for the PUSCH in each slot is located at the fourth one (l=3) of seven normal CP symbols.

The DM RS sequence $r_1^{PUSCH}(\bullet)$ on the component carrier 1 is defined as $$r_1^{PUSCH}(m \cdot M_{sc}^{RS} + n) = r_{u_1,v_1}^{(\alpha_1)}(n)$$

where $m=0,1$ $n=0,\ldots,M_{sc}^{RS}-1$

The sequence length is the number of subcarriers corresponding to the section of bandwidth:

$$M_{sc}^{RS}=M_{sc}^{PUSCH}=96$$

m=0,1 correspond to two slots in a subframe (1 ms) respectively.

After the sequence $r^{PUSCH}(\bullet)$ is multiplied by a magnitude scaling factor $\beta_{PUSCH}$, starting with $r^{PUSCH}(0)$, the sequence $r^{PUSCH}(\bullet)$ is mapped to the same physical resource block set for corresponding the $1^{st}$ section of the PUSCH transmission. When the sequence $r^{PUSCH}(\bullet)$ is mapped to RE (k,l) of a subframe, the mapping is performed first in frequency domain (k) and then in time-domain (l) in an ascending order of k and l. The DM RS for the PUSCH in each slot is located at the fourth one (l=3) of seven normal CP symbols.

The DM RS sequence on the component carrier 2 is defined as $$r_2^{PUSCH}(m \cdot M_{sc}^{RS}+n) = r_{u_2,v_2}^{(\alpha_2)}(n)$$

where $$m=0,1$$

$$n=0,\ldots,M_{sc}^{RS}-1$$

The sequence length is the number of subcarriers corresponding to the section of bandwidth, $$M_{sc}^{RS} = M_{sc}^{PUSCH} = 96$$

m=0,1 correspond to two slots in a subframe (1 ms) respectively.

After the sequence $r^{PUSCH}(\bullet)$ is multiplied by a magnitude scaling factor $\beta_{PUSCH}$, starting with $r^{PUSCH}(0)$, the sequence $r^{PUSCH}(\bullet)$ is mapped to the same physical resource block set for corresponding the $2^{th}$ section of the PUSCH transmission. When the sequence $r^{PUSCH}(\bullet)$ is mapped to RE (k,l) of a subframe, the mapping is performed first in frequency domain (k) and then in time-domain (l) in an ascending order of k and l. The DM RS for the PUSCH in each slot is located at the fourth one (l=3) of seven normal CP symbols.

The cyclic shift quantities of the DM RS sequences on the component carriers 1 and 2 are the same, and the cyclic shift quantity on the component carrier 0 is different, that is $\alpha_0 \neq \alpha_1 = \alpha_2$.

The group serial numbers of the base sequences of the DM RSs on the component carriers 1 and 2 are the same, while the group serial number on the component carrier 0 is different, that is $u_0 \neq u_1 = u_2$. If the group hopping function is on, group hopping patterns of the DM RS sequences on the component carriers 1 and 2 are the same, while the group hopping pattern on the component carrier 0 is different.

The lengths of the DM RS sequences on the three component carriers satisfy $M_{sc}^{RS} \geq 6N_{sc}^{RB}=72$, the intragroup sequence serial number of the base sequence is 0 or 1.

The base sequences of DM RSs on the component carriers 1 and 2 come from the same group and have the same cyclic shift quantity, and their sequence lengths are the same. In the same slot, the intragroup sequence serial numbers of the two DM RS sequences are different and satisfy:

$$v_2 = (v_1+1) \bmod 2$$

If the group hopping function is off while the sequence hopping function is on, the sequence hopping patterns of the two DM RS sequences are different and just contrary, that is, $$v_0(n_s) = (v_2(n_s)+1) \bmod 2$$

The PUSCH of the UE1 is not frequency hopping in the subframe. In each component carrier, the PUSCH is located at the same frequency domain location in two slots in the subframe. Therefore, in each component carrier, the corresponding DM RSs are also located at the same frequency domain location in the two slots in the subframe.

The Sixth Embodiment

Assuming that in the LTE-A system, the PUSCH of a user equipment 1 is transmitted on two component carriers, and the uplink system bandwidths of the two component carriers are all 15 MHz. Using non-continuous resource allocation on the component carrier 0, the non-continuous bandwidths correspond to 12 PRBs and 144 subcarriers, and 24 PRBs and 288 subcarriers in frequency domain respectively. Using continuous resource allocation on the component carrier 1, the non-continuous bandwidth corresponds to 16 PRBs and 192 subcarriers in frequency domain.

In each component carrier, the UE1 sends demodulation reference signals (DM RS) for the PUSCH on the bandwidth occupied by the PUSCH of the UE1. The DM RSs on each component carrier are an independent sequence.

The DM RS sequence $r_0^{PUSCH}(\bullet)$ on the component carrier 0 is defined as $$r_0^{PUSCH}(m \cdot M_{sc}^{RS}+n) = r_{u_0,v_0}^{(\alpha_0)}(n)$$

where $$m=0,1$$

$$n=0,\ldots,M_{sc}^{RS}-1$$

The sequence length is the number of subcarriers corresponding to the bandwidth occupied by the PUSCH on the component carrier:

$$M_{sc}^{RS} = M_{sc}^{PUSCH} = 432$$

m=0,1 correspond to the two slots in a subframe (1 ms) respectively.

The DM RS sequence $r^{PUSCH,0}(\bullet)$ on the $0^{th}$ section of bandwidth is $$r^{PUSCH,0}(m \cdot M_{sc}^{PUSCH,0}+n) = r_0^{PUSCH}(m \cdot M_{sc}^{RS}+n)$$

where $$m=0,1$$

$$n=0,\ldots,M_{sc}^{PUSCH,0}-1$$

and $$M_{sc}^{PUSCH,0} = 144$$

The DM RS sequence $r^{PUSCH,1}(\bullet)$ on the $1^{st}$ section of bandwidth is:

$$r^{PUSCH,1}(m \cdot M_{sc}^{PUSCH,1}+n) = r_0^{PUSCH}(m \cdot M_{sc}^{RS}+M_{sc}^{PUSCH,0}+n)$$

where $$m=0,1$$

$$n=0,\ldots,M_{sc}^{PUSCH,1}-1$$

and $$M_{sc}^{PUSCH,1} = 288$$

That is, the sequence $r_0^{PUSCH}(\bullet)$ is divided into two sections, the length of the $0^{th}$ section of the sequence is the number 144 of subcarriers corresponding to the $0^{th}$ section of the PUSCH, and the length of the $1^{st}$ section of the sequence is the number 288 of subcarriers corresponding to the $1^{st}$ section of the PUSCH.

After the sequence $r^{PUSCH}(\bullet)$ is multiplied by a magnitude scaling factor $\beta_{PUSCH}$, starting with $r^{PUSCH}(0)$, the sequence $r^{PUSCH}(\bullet)$ is mapped to the same physical resource block set for corresponding the $0^{th}$ section of the PUSCH transmission. When the sequence $r^{PUSCH}(\bullet)$ is mapped to RE (k,l) of a subframe, the mapping is performed first in frequency domain (k) and then in time-domain (l) in an ascending order of k and l. The DM RS for the PUSCH in each slot is located at the fourth one (l=3) of seven normal CP symbols.

The DM RS sequence $r_1^{PUSCH}(\cdot)$ on the component carrier 1 is defined as $$r_1^{PUSCH}(m \cdot M_{sc}^{RS}+n) = r_{u_1,v_1}^{(\alpha 1)}(n)$$

where $m=0,1$ $n=0,\ldots,M_{sc}^{RS}-1$

The sequence length is the number of subcarriers corresponding to the section of bandwidth $$M_{sc}^{RS} = M_{sc}^{PUSCH} = 192$$

m=0,1 correspond to the two slots in a subframe (1 ms) respectively.

After the sequence $r^{PUSCH}(\cdot)$ is multiplied by a magnitude scaling factor $\beta_{PUSCH}$, starting with $r^{PUSCH}(0)$, the sequence $r^{PUSCH}(\cdot)$ is mapped to the same physical resource block set for corresponding the 1$^{st}$ section of the PUSCH transmission. When the sequence $r^{PUSCH}(\cdot)$ is mapped to RE (k,l) of a subframe, the mapping is performed first in frequency domain (k) and then in time-domain (l) in an ascending order of k and l. The DM RS for the PUSCH in each slot is located at the fourth one (l=3) of seven normal CP symbols.

The cyclic shift quantities of the DM RS sequences on the component carriers 0 and 1 are different, that is $\alpha_0 \neq \alpha_1$.

The group serial numbers of the base sequences of the DM RSs on the component carriers 0 and 1 are different, that is, $u_0 \neq u_1$. If the group hopping function is on, group hopping patterns of the DM RS sequences on the component carriers 1 and 2 are different.

The lengths of the DM RS sequences on the two component carriers satisfy $M_{sc}^{RS} \geq 6N_{sc}^{RB} = 72$, the intragroup sequence serial number of the base sequence is 0 or 1. If the group hopping function is off, and the sequence hopping function is on, the intragroup sequence serial numbers $v_0$ and $v_1$ of the two DM RS sequences respectively vary with the slot $n_s=0, 1, \ldots, 19$ in a radio frame.

The PUSCH of the UE1 is not frequency hopping in this subframe. In each component carrier, the PUSCH is located at the same frequency domain location in two slots in the subframe. Therefore, in each component carrier, the corresponding DM RSs are also located at the same frequency domain location in the two slots in the subframe.

The Seventh Embodiment

Assuming that in the LTE-A system, the PUSCH of a user equipment 1 is transmitted on two component carriers, and the uplink system bandwidths of the two component carriers are all 10 MHz. Using non-continuous resource allocation on the component carrier 0, the non-continuous bandwidths correspond to 12 PRBs and 144 subcarriers, and 24 PRBs and 288 subcarriers in frequency domain respectively. Using non-continuous resource allocation on the component carrier 1, the non-continuous bandwidths correspond to 16 PRBs and 192 subcarriers and 12 PRBs and 144 subcarriers in frequency domain respectively.

In each component carrier, the UE1 sends demodulation reference signals (DM RS) for the PUSCH on the bandwidth occupied by the PUSCH of the UE1. In each component carrier, the DM RSs on each section of bandwidth are an independent sequence.

The DM RS sequence $r_0^{PUSCH,0}(\cdot)$ on the 0$^{th}$ section of bandwidth on the 0$^{th}$ section of bandwidth is:

$$r_0^{PUSCH,0}(m \cdot M_{sc}^{RS}+n) = r_{u_0,v_0}^{(\alpha 0)}(n)$$

where $m=0,1$ $n=0,\ldots,M_{sc}^{RS}-1$

The sequence length is the number of subcarriers corresponding to the bandwidth occupied by the PUSCH on the component carrier $$M_{sc}^{RS} = M_{sc}^{PUSCH,0} = 144$$

After the sequence $r^{PUSCH}(\cdot)$ is multiplied by a magnitude scaling factor $\beta_{PUSCH}$, starting with $r^{PUSCH}(0)$, the sequence $r^{PUSCH}(\cdot)$ is mapped to the same physical resource block set for corresponding the 0$^{th}$ section of the PUSCH transmission. When the sequence $r^{PUSCH}(\cdot)$ is mapped to RE (k,l) of a subframe, the mapping is performed first in frequency domain (k) and then in time-domain (l) in an ascending order of k and l. The DM RS for the PUSCH in each slot is located at the fourth one (l=3) of seven normal CP symbols.

$$r_0^{PUSCH,1}(m \cdot M_{sc}^{RS}+n) = r_{u_0,v_0}^{(\alpha 0)}(n)$$

The DM RS sequence $r_0^{PUSCH,1}(\cdot)$ on the first section of bandwidth is:
where $m=0,1$ $n=0,\ldots,M_{sc}^{RS}-1$ The sequence length is the number of subcarriers corresponding to the section of bandwidth $$M_{sc}^{RS} = M_{sc}^{PUSCH,0} = 288$$

After the sequence $r^{PUSCH}(\cdot)$ is multiplied by a magnitude scaling factor $\beta_{PUSCH}$, starting with $r^{PUSCH}(0)$, the sequence $r^{PUSCH}(\cdot)$ is mapped to the same physical resource block set for corresponding to the 1$^{st}$ section of the PUSCH transmission. When the sequence $r^{PUSCH}(\cdot)$ is mapped to RE (k,l) of a subframe, the mapping is performed first in frequency domain (k) and then in time-domain (l) in an ascending order of k and l. The DM RS for the PUSCH in each slot is located at the fourth one (l=3) of seven normal CP symbols.

The DM RS sequence $r_1^{PUSCH,0}(\cdot)$ on the 0$^{th}$ section of bandwidth on the component carrier 1 is $$r_1^{PUSCH,0}(m \cdot M_{sc}^{RS}+n) = r_{u_1,v_1}^{(\alpha 1)}(n)$$

where $m=0,1$ $n=0,\ldots,M_{sc}^{RS}-1$

The sequence length is the number of subcarriers corresponding to the bandwidth occupied by the PUSCH on the component carrier is $$M_{sc}^{RS} = M_{sc}^{PUSCH,0} = 192$$

After the sequence $r^{PUSCH}(\cdot)$ is multiplied by a magnitude scaling factor $\beta_{PUSCH}$, starting with $r^{PUSCH}(0)$, the sequence $r^{PUSCH}(\cdot)$ is mapped to the same physical resource block set for corresponding the 0$^{th}$ section of the PUSCH transmission. When the sequence $r^{PUSCH}(\cdot)$ is mapped to RE(k,l) of a subframe, the mapping is performed first in frequency domain (k) and then in time-domain (l) in an ascending order of k and l. The DM RS for the PUSCH in each slot is located at the fourth one (l=3) of seven normal CP symbols.

The DM RS sequence $r_1^{PUSCH}(\cdot)$ on the first section of bandwidth is $$r_1^{PUSCH,1}(m \cdot M_{sc}^{RS}+n) = r_{u_1,v_1}^{(\alpha 1)}(n) \text{ where}$$

$$m=0,1$$

$$n=0,\ldots,M_{sc}^{RS}-1$$

The sequence length is the number of subcarriers corresponding to the section of bandwidth $$M_{sc}^{RS} = M_{sc}^{PUSCH,1} = 144$$

After the sequence $r^{PUSCH}(\cdot)$ is multiplied by a magnitude scaling factor $\beta_{PUSCH}$, starting with $r^{PUSCH}(0)$, the sequence $r^{PUSCH}(\cdot)$ is mapped to the same physical resource block set for corresponding the 1$^{st}$ section of the PUSCH transmission. When the sequence $r^{PUSCH}(\cdot)$ is mapped to RE (k,l) of a subframe, the mapping is performed first in frequency domain (k) and then in time-domain (l) in an ascending order of k and l. The DM RS for the PUSCH in each slot is located at the fourth one (l=3) of seven normal CP symbols.

The cyclic shift quantities of the DM RS sequences on the component carriers 0 and 1 are different, that is $\alpha_0 \neq \alpha_1$. In one component carrier, the cyclic shift quantities of the DM RS sequences on the two sections of bandwidths are the same.

The group serial numbers of the base sequences of the DM RSs on the component carriers 0 and 1 are different, that is $u_0 \neq u_1$. In one component carrier, the group serial numbers of the base sequences of the DM RSs on the two sections of bandwidth are the same. If the group hopping function is on, group hopping patterns of the DM RS sequences on the component carriers 1 and 2 are different; in one component carrier, group hopping patterns of the DM RS sequences on the two sections of bandwidth are the same.

In two component carriers, the lengths of the DM RS sequences on the four sections of bandwidth satisfy $M_{sc}^{RS} \geq 6N_{sc}^{RB}=72$, the intragroup sequence serial number of the base sequence is 0 or 1. If the group hopping function is off, and the sequence hopping function is on, the intragroup sequence serial number of the two DM RS sequences in the same group on one component carrier vary with the slot $n_s=0, 1, \ldots, 19$ according to same group hopping pattern in a radio frame.

The PUSCH of the UE1 is not frequency hopping in this subframe. In each component carrier, the PUSCH is located at the same frequency domain location in two slots in the subframe. Therefore, in each component carrier, the corresponding DM RSs are also located at the same frequency domain location in the two slots in the subframe.

The above description is only the embodiments of the present invention and is not intended to limit the present invention. Various modifications and variations to the present invention may be made by those skilled in the art. Any modification, equivalent substitution and variation made within the spirit and principle of the present invention should be covered in the scope of the appended claims of the present invention.

INDUSTRIAL APPLICABILITY

The method and apparatus for transmitting reference signals in accordance with the present invention solve the problem of transmitting demodulation reference signals (DM RS) of the PUSCH when a plurality of component carriers aggregate as well as the problem of transmitting the DM RSs during PUSCH non-continuous resource allocation in one component carrier in the LTE-A system.

What is claimed is:

1. A method for transmitting reference signals comprising:
   during carrier aggregation, a user equipment sending physical uplink shared channel (PUSCH) on one or more component carriers, and sending demodulation reference signals (DM RS) for the PUSCH on each section of bandwidth occupied by the PUSCH on each component carrier, wherein
   a DM RS sequence on a section of bandwidth is an independent sequence or part of an independent sequence and forms an independent sequence with DM RS sequences on multiple sections of bandwidth other than the section of bandwidth; and
   the section of bandwidth is a section of continuous bandwidth occupied by the PUSCH on any component carrier, or is any of the multiple sections of bandwidth occupied by the PUSCH on any component carrier.

2. The method according to claim 1, wherein the DM RS sequences on the multiple sections of bandwidth occupied by the PUSCH on the same component carrier form an independent sequence, and the DM RS sequence on each section of bandwidth is part of the independent sequence.

3. The method according to claim 1, wherein the DM RS sequence on each section of bandwidth occupied by the PUSCH on each component carrier is an independent sequence.

4. The method according to claim 1, wherein a base sequence of the DM RS sequence on each section of bandwidth comes from the same or a different group, when a group hopping function is on, a group serial number u of the DM RS sequence on each section of bandwidth varies with a slot in one radio frame, and a group hopping pattern of the DM RS sequence on each section of bandwidth is the same or different.

5. The method according to claim 4, wherein in the same slot, if base sequences of a plurality of independent sequences come from the same group and have the same cyclic shift quantity, and lengths of the sequences are the same and greater than or equal to $6N_{sc}^{RB}$, where $N_{sc}^{RB}$ is the number of subcarriers occupied by one physical resource block in frequency domain, then the intragroup sequence serial numbers of the base sequences of the plurality of independent sequences are the same or different, when group hopping function is off while sequence hopping function is on, sequence hopping patterns of the plurality of independent sequences are the same or different, and the independent sequence is a DM RS sequence on a section of bandwidth or a sequence formed collectively from DM RS sequences on multiple sections of bandwidth.

6. The method according to claim 4, wherein if base sequences of two independent sequences come from the same group and have the same cyclic shift quantity, and lengths of the two independent sequences are the same and greater than or equal to $6N_{sc}^{RB}$, where $N_{sc}^{RB}$ is the number of subcarriers occupied by one physical resource block in frequency domain, then the intragroup sequence serial numbers $v_i, v_j \in \{0,1\}$ of the two independent sequences satisfy $v_i = (v_j + 1) \mod 2$; if the group hopping function is off while the sequence hopping function is on, sequence hopping patterns of the two independent sequences satisfy $v_i(n_s) = (v_j(n_s)+1) \mod 2$, and each of the independent sequences is a DM RS sequence on a section of bandwidth or a sequence formed collectively from DM RS sequences on multiple sections of bandwidth.

7. The method according to claim 1, wherein when the DM RS sequence on the section of bandwidth is an independent sequence, the DM RS sequence $r^{PUSCH}(\bullet)$ on the section of bandwidth is:

$$r^{PUSCH}(m \cdot M_{sc}^{RS}+n)=r_{u,v}^{(\alpha)}(n)$$

where $m=0,1$ $n=0,\ldots,M_{sc}^{RS}-1$ and the sequence length $M_{sc}^{RS}$ is the number of subcarriers $M_{sc}^{PUSCH}$ corresponding to the section of bandwidth, $m=0,1$ correspond to two slots in one subframe respectively, $\alpha$ is the cyclic shift quantity, u is the group serial number, and v is the intragroup sequence serial number.

8. The method according to claim 7, wherein after the sequence $r^{PUSCH}(\bullet)$ is multiplied by a magnitude scaling factor $\beta_{PUSCH}$, starting with $r^{PUSCH}(0)$, the sequence $r^{PUSCH}(\bullet)$ is mapped to the same physical resource block set for corresponding PUSCH transmission, when the sequence $r^{PUSCH}(\bullet)$ is mapped to RE(k,l) of a subframe, the mapping is performed first in frequency domain (k) and then in time-domain (l) in an ascending order of k and l, the DM RS for the PUSCH in each slot is located at the fourth one (l=3) of seven normal cyclic prefix symbols or the third one (l=2) of six extended cyclic prefix symbols.

9. The method according to claim 1, wherein when DM RS sequences on R sections of bandwidth are part of the independent sequence $r^{PUSCH}(\bullet)$, $r^{PUSCH}(\bullet)$ is $$r^{PUSCH}(m \cdot M_{sc}^{RS}+n)=r_{u,v}^{(\alpha)}(n)$$

where $m=0,1$ $n=0,\ldots,M_{sc}^{RS}-1$ and $M_{sc}^{RS}=M_{sc}^{PUSCH}$ where (n) is the base sequence, $\alpha$ is the cyclic shift quantity, u is the group serial number, v is the intragroup sequence serial number; $m=0,1$ correspond to two slots in a subframe respectively, and $M_{sc}^{PUSCH}$ is the total number of subcarriers corresponding to the R sections of bandwidth, the DM RS sequence $r^{PUSCH,r}(\bullet)$ on the $r^{th}$ section of bandwidth of the R sections of bandwidths is:

$$r^{PUSCH,r}(m \cdot M_{sc}^{PUSCH,r} + n) = r^{PUSCH}\left(m \cdot M_{sc}^{RS} + \sum_{i=0}^{r-1} M_{sc}^{PUSCH,i} + n\right)$$

where $r=1,\ldots,R-1$ $m=0,1$ $n=0,\ldots,M_{sc}^{PUSCH,r}-1$ the DM RS sequence $r^{PUSCH,0}(\bullet)$ on the $0^{th}$ section of bandwidth is:

$$r^{PUSCH,0}(m \cdot M_{sc}^{PUSCH,0}+n)=r^{PUSCH}(m \cdot M_{sc}^{RS}+n)$$

where $m=0,1$ $n=0,\ldots,M_{sc}^{PUSCH,0}-1$ $M_{sc}^{PUSCH,r}$ is the number of subcarriers corresponding to the $r^{th}$ section of bandwidth.

10. The method according to claim 9, wherein after the sequence $r^{PUSCH}(\bullet)$ is multiplied by a magnitude scaling factor $\beta_{PUSCH}$, starting with $r^{PUSCH}(0)$, the sequence $r^{PUSCH}(\bullet)$ is mapped to the same physical resource block set for corresponding PUSCH transmission, when the sequence $r^{PUSCH}(\bullet)$ is mapped to RE(k,l) of a subframe, the mapping is performed first in frequency domain (k) and then in time-domain (l) in an ascending order of k and l, the DM RS for the PUSCH in each slot is located at the fourth one (l=3) of seven normal cyclic prefix symbols or the third one (l=2) of six extended cyclic prefix symbols.

11. An apparatus for transmitting reference signals configured to: during carrier aggregation, send demodulation reference signals (DM RS) for PUSCH on each section of bandwidth occupied by the PUSCH on each component carrier, wherein a DM RS sequence on a section of bandwidth is an independent sequence or part of an independent sequence and forms an independent sequence with DM RS sequences on multiple sections of bandwidth other than the section of bandwidth; and the section of bandwidth is a section of continuous bandwidth occupied by the PUSCH on any component carrier, or is any of the multiple sections of bandwidth occupied by the PUSCH on any component carrier.

12. The apparatus according to claim 11, wherein the DM RS sequence sent by the apparatus satisfies the following conditions: the DM RS sequences on the multiple sections of bandwidth occupied by the PUSCH on the same component carrier form an independent sequence, and the DM RS sequence on each section of bandwidth is part of the independent sequence.

13. The apparatus according to claim 11, wherein the DM RS sequence sent by the apparatus on each section of bandwidth occupied by the PUSCH on each component carrier is an independent sequence.

14. The apparatus according to claim 11, wherein the DM RS sequence sent by the apparatus satisfies the following conditions: a base sequence of the DM RS sequence on each section of bandwidth comes from the same or a different group, when a group hopping function is on, a group serial number u of the DM RS sequence on each section of bandwidth varies with a slot in one radio frame, and a group hopping pattern of the DM RS sequence on each section of bandwidth is the same or different.

15. The apparatus according to claim 14, wherein the DM RS sequence sent by the apparatus satisfies the following conditions: in the same slot, if base sequences of a plurality of independent sequences come from the same group and have the same cyclic shift quantity, and lengths of the sequences are the same and greater than or equal to $6N_{sc}^{RB}$, where $N_{sc}^{RB}$ is the number of subcarriers occupied by one physical resource block in frequency domain, then the intragroup sequence serial numbers of the base sequences of the plurality of independent sequences are the same or different, when group hopping function is off while sequence hopping function is on, sequence hopping patterns of the plurality of independent sequences are the same or different, and the independent sequence is a DM RS sequence on a section of bandwidth or a sequence formed collectively from DM RS sequences on multiple sections of bandwidth.

16. The apparatus according to claim 13, wherein the DM RS sequence sent by the apparatus satisfies the following conditions: if base sequences of two independent sequences come from the same group and have the same cyclic shift quantity, and lengths of the two independent sequences are the same and greater than or equal to $6N_{sc}^{RB}$, where $N_{sc}^{RB}$ is the number of subcarriers occupied by one physical resource block in frequency domain, then the intragroup sequence serial numbers $v_i, v_j \in \{0,1\}$ of the two independent sequences satisfy $v_i = (v_j+1) \mod 2$; if the group hopping function is off while the sequence hopping function is on, sequence hopping patterns of the two independent sequences satisfy $v_i(n_s) = (v_j(n_s)+1) \mod 2$, and each of the independent sequences is a DM RS sequence on a section of bandwidth or a sequence formed collectively from DM RS sequences on multiple sections of bandwidth.

17. The apparatus according to claim 11, wherein the DM RS sequence sent by the apparatus satisfies the following conditions: when the DM RS sequence on the section of bandwidth is an independent sequence, the DM RS sequence $r^{PUSCH}(\bullet)$ on the section of bandwidth is:

$$r^{PUSCH}(m \cdot M_{sc}^{RS}+n) = r_{u,v}^{(\alpha)}(n)$$

where $m=0,1$ $n=0,\ldots,M_{sc}^{RS}-1$ and the sequence length $M_{sc}^{RS}$ is the number of subcarriers $M_{sc}^{PUSCH}$ corresponding to the section of bandwidth, $m=0,1$ correspond to two slots in one subframe respectively, $\alpha$ is the cyclic shift quantity, u is the group serial number, and v is the intragroup sequence serial number.

18. The apparatus according to claim 17, wherein the apparatus is further configured to: after the sequence $r^{PUSCH}(\bullet)$ is multiplied by a magnitude scaling factor $\beta_{PUSCH}$, starting with $r^{PUSCH}(0)$, map the sequence $r^{PUSCH}(\bullet)$ to the same physical resource block set for corresponding PUSCH transmission, and when the sequence $r^{PUSCH}(\bullet)$ is mapped to RE (k,l) of a subframe, perform the mapping first in frequency domain and then in time-domain in an ascending order of k and l, the DM RS for the PUSCH in each slot being located at the fourth one (l=3) of seven normal cyclic prefix symbols or the third one (l=2) of six extended cyclic prefix symbols.

19. The apparatus according to claim 11, wherein the DM RS sequence sent by the apparatus satisfies the following conditions: when DM RS sequences on R sections of bandwidth are part of the independent sequence $r^{PUSCH}(\bullet)$, $r^{PUSCH}(\bullet)$ is $$r^{PUSCH}(m \cdot M_{sc}^{RS}+n) = r_{u,v}^{(\alpha)}(n)$$

where $m=0,1$ $n=0,\ldots,M_{sc}^{RS}-1$ and $M_{sc}^{RS} = M_{sc}^{PUSCH}$ where $r_{u,v}(n)$ is the base sequence, $\alpha$ is the cyclic shift quantity, u is the group serial number, v is the intragroup sequence serial number; m=0,1 correspond to two slots in a subframe respectively, and $M_{sc}^{PUSCH}$ is the total number of subcarriers corresponding to the R sections of bandwidth, the DM RS sequence $r^{PUSCH,r}(\bullet)$ on the $r^{th}$ section of bandwidth of the R sections of bandwidths is:

$$r^{PUSCH,r}(m \cdot M_{sc}^{PUSCH,r}+n) = r^{PUSCH}\left(m \cdot M_{sc}^{RS}+\sum_{i=0}^{r-1} M_{sc}^{PUSCH,i}+n\right)$$

where $r=1,\ldots,R-1$ $m=0,1$ $n=0,\ldots,M_{sc}^{PUSCH,r}-1$ the DM RS sequence $r^{PUSCH,0}(\bullet)$ on the $0^{th}$ section of bandwidth is:

$$r^{PUSCH,0}(m \cdot M_{sc}^{PUSCH,0}+n) = r^{PUSCH}(m \cdot M_{sc}^{RS}+n)$$

where $m=0,1$ $n=0,\ldots,M_{sc}^{PUSCH,0}-1$ $M_{sc}^{PUSCH,r}$ is the number of subcarriers corresponding to the $r^{th}$ section of bandwidth.

20. The apparatus according to claim 19, wherein the apparatus is further configured to: after the sequence $r^{PUSCH}(\bullet)$ is multiplied by a magnitude scaling factor $\beta^{PUSCH}$, starting with $r^{PUSCH}(0)$, map the sequence $r^{PUSCH}(\bullet)$ to the same physical resource block set for corresponding PUSCH transmission, and when the sequence $r^{PUSCH}(\bullet)$ is mapped to RE(k,l) of a subframe, perform the mapping first in frequency domain and then in time-domain in an ascending order of k and l, the DM RS for the PUSCH in each slot being located at the fourth one (l=3) of seven normal cyclic prefix symbols or the third one (l=2) of six extended cyclic prefix symbols.

* * * * *

UNITED STATES PATENT AND TRADEMARK OFFICE
CERTIFICATE OF CORRECTION

PATENT NO. : 8,437,270 B2
APPLICATION NO. : 13/258565
DATED : May 7, 2013
INVENTOR(S) : Peng Zhu et al.

Page 1 of 2

It is certified that error appears in the above-identified patent and that said Letters Patent is hereby corrected as shown below:

In the Specifications:

Column 1, lines 54-55, the expression should appear as follows:
$$r_{u,v}^{(\alpha)}(n) = e^{j\alpha n}\overline{r}_{u,v}(n), \quad 0 \leq n \leq M_{sc}^{RS} - 1$$

Column 1, line 56, after "where" the expression should appear as follows:
$$M_{sc}^{RS} = mN_{sc}^{RB}$$

Column 1, line 57, after "sequence," the expression should appear as follows:
$$1 \leq m \leq N_{RB}^{max,UL}$$

Column 2, line 5, after "If" the expression should appear as follows:
$$M_{sc}^{RS} \geq 3N_{sc}^{RB}$$

Column 2, lines 6-7, the expression should appear as follows:
$$\overline{r}_{u,v}(n) = x_q(n \bmod N_{ZC}^{RS}), \quad 0 \leq n \leq M_{sc}^{RS} - 1$$

Column 2, lines 24-25, the expression should appear as follows:
$$\overline{r}_{u,v}(n) = e^{j\varphi(n)\pi/4}, \quad 0 \leq n \leq M_{sc}^{RS} - 1$$

Column 3, line 32, before "for each length," the expression should appear as follows:
$$N_{sc}^{RB} \leq M_{sc}^{RS} \leq 5N_{sc}^{RB}$$

Column 3, line 34, before "for each length" the expression should appear as follows:
$$6N_{sc}^{RB} \leq M_{sc}^{RS} \leq N_{RB}^{max,UL} \cdot N_{sc}^{RB}$$

Column 4, line 31, after "reference signal sequence is" the expression should appear as follows:
$$M_{sc}^{RS} \geq 6N_{sc}^{RB}$$

Column 4, line 37, before ", there are two base sequences" the expression should appear as follows:
$$M_{sc}^{RS} \geq 6N_{sc}^{RB}$$

Signed and Sealed this
First Day of October, 2013

Teresa Stanek Rea
*Deputy Director of the United States Patent and Trademark Office*

CERTIFICATE OF CORRECTION (continued)
U.S. Pat. No. 8,437,270 B2

Column 12, line 19, after "same and satisfy" the expression should appear as follows:
$M_{sc}^{RS} \geq 6N_{sc}^{RB}$ Column 18, line 17, after "of bandwidth satisfy" the expression should appear as follows:
$M_{sc}^{RS} \geq 6N_{sc}^{RB} = 72$ Column 21, line 37, after "carriers satisfy" the expression should appear as follows:
$M_{sc}^{RS} \geq 6N_{sc}^{RB} = 72$ Column 23, line 37, after "carriers satisfy" the expression should appear as follows:
$M_{sc}^{RS} \geq 6N_{sc}^{RB} = 72$ Column 24, line 25, please delete the expression "$r_0^{PUSCH.1}(m \cdot M_{sc}^{RS} + n) = r_{u_0,v_0}^{(\alpha_0)}(n)$,"

Column 24, line 28, after "bandwidth is" please insert -- $r_0^{PUSCH.1}(m \cdot M_{sc}^{RS} + n) = r_{u_0,v_0}^{(\alpha_0)}(n)$ --.

Column 25, line 40, before ", the intragroup sequence serial number" the expression should appear as follows:
$M_{sc}^{RS} \geq 6N_{sc}^{RB} = 72$ In the Claims:

Column 27, line 45, after "where" please delete "(n)" and insert -- $r_{u,v}(n)$ --.

Column 29, line 5, after "16. The apparatus according to" please delete "claim 13" and insert --claim 15--.

Column 29, line 35, the expression should appear as follows:
$n = 0,...,M_{SC}^{RS} - 1$ Column 30, line 13, after "is the base sequence," please delete "a" and insert --α--.